US012447587B2

(12) United States Patent
Baryam

(10) Patent No.: US 12,447,587 B2
(45) Date of Patent: Oct. 21, 2025

(54) TORQUE SLIDER TONG ASSEMBLY

(71) Applicant: Jacob Baryam, Houston, TX (US)

(72) Inventor: Jacob Baryam, Houston, TX (US)

( * ) Notice: Subject to any disclaimer, the term of this patent is extended or adjusted under 35 U.S.C. 154(b) by 272 days.

(21) Appl. No.: 17/990,612

(22) Filed: Nov. 18, 2022

(65) Prior Publication Data

US 2024/0165773 A1 May 23, 2024

(51) Int. Cl.
*B25B 13/50* (2006.01)
*E21B 19/16* (2006.01)

(52) U.S. Cl.
CPC ........ *B25B 13/5041* (2013.01); *E21B 19/163* (2013.01); *E21B 19/166* (2013.01)

(58) Field of Classification Search
CPC ..... B25B 13/52; B25B 13/488; B25B 13/142; B25B 13/14; B25B 13/1422; B25B 13/5008; B25B 13/5016; B25B 17/02; E21B 19/166; E21B 19/163
USPC .... 81/57.2, 57.33, 57.34, 57.16, 415, 177.2, 81/177.5
See application file for complete search history.

(56) References Cited

U.S. PATENT DOCUMENTS

| | | | | |
|---|---|---|---|---|
| 452,237 | A * | 5/1891 | Robinson | B25B 13/488 81/57.32 |
| 1,708,147 | A * | 4/1929 | Miller | B25B 13/488 81/57.32 |
| 2,540,553 | A * | 2/1951 | Shobe | B25B 13/5058 269/45 |
| 4,409,866 | A | 10/1983 | McBride | |
| 6,571,646 | B1 * | 6/2003 | Truesdell | G01L 5/24 73/862.21 |
| 7,997,166 | B2 * | 8/2011 | Lauzon | E21B 19/161 81/57.36 |
| 8,601,911 | B1 | 12/2013 | Baryam | |
| 9,022,374 | B1 | 5/2015 | Baryam | |
| 9,097,071 | B1 | 8/2015 | Baryam | |
| 9,228,399 | B1 | 1/2016 | Baryam | |
| 9,297,222 | B1 | 3/2016 | Baryam | |
| 9,551,194 | B1 | 1/2017 | Baryam | |
| 9,551,195 | B1 | 1/2017 | Baryam | |
| 2004/0125609 | A1 * | 7/2004 | Gilligan | B60B 29/00 362/486 |
| 2004/0138019 | A1 * | 7/2004 | Liu | B25B 13/48 474/160 |

(Continued)

*Primary Examiner* — Tom Rodgers
(74) *Attorney, Agent, or Firm* — NOLTE LACKENBACH SIEGEL

(57) ABSTRACT

A torque slider tong assembly provides a safe, convenient, light weight, portable, hand-operable dual pipe wrench for use in makeup and breakout of tubular connections. The torque-slider tong assembly includes a backup arm forming a first pipe wrench gripping a first pipe, a torque arm forming a second pipe wrench gripping a second pipe, and an actuator providing motive force moving the torque arm relative to the backup arm transverse to the pipes, which rotates the pipes relative to each other. A torque slider adjustably connects the actuator to the backup arm to adjust the mechanical advantage between the backup arm and the torque arm providing additional setup flexibility. Similarly, a movable pivot point, such as a clevis, adjustably connects the actuator to the torque arm providing additional setup flexibility. Quick-change pins allow positional adjustment of multiple components.

18 Claims, 26 Drawing Sheets

(56) References Cited

U.S. PATENT DOCUMENTS

| | | | | |
|---|---|---|---|---|
| 2007/0214921 | A1 * | 9/2007 | Fechter | B25B 23/145<br>81/467 |
| 2016/0339571 | A1 * | 11/2016 | Hensel | B25B 27/20 |

* cited by examiner

TORQUE SLIDER TONG ASSEMBLY

TECHNICAL FIELD

The present invention is directed to pipe handling equipment. More particularly, the present invention is directed a safe, light weight, portable, efficient, and low cost hand-operable pipe wrench or tong assembly with a torque slider providing setup flexibility for use in makeup and breakout of tubular connections.

BACKGROUND

Pipe handling operations makeup and breakout tubular connections, at adjoining lengths of well tubes and the like. Conventional rig wellbores provide fixed hydraulic tong assemblies to simultaneously grip pipes adjacent to a joint. For example, U.S. Pat. Nos. 9,551,194 and 9,551,195, which are incorporated by reference, describe heavy duty hydraulic assemblies. These conventional rig tongs are awkward and heavy equipment requiring a crane or forklift to lift into position. Conventional oil rig tong systems cannot be manually reoriented and are unsuited for other applications. Conventional oil rig tongs are not hand tools that can be easily broken down into modular components, lifted, carried and operated by hand. Conventional systems require major equipment disassembly, specialized tools, and lifting equipment to reassemble. A continuing need therefore exists for lighter weight, safer, adaptable, and more versatile tong assemblies suitable for a wider range of operations relating to tubular connections.

SUMMARY

At least one of the concerns described above are met in a safer, light weight, portable, hand-operable dual pipe wrench or tong assembly with a torque slider providing setup flexibility for use in makeup and breakout of tubular connections.

Such tubular connections may exist in any industry involving rotational element handling operations, and are not limited to the oil, drilling, plumbing, steam, water-rig, or other industrial uses. The tong assembly rotates a first pipe with respect to a second pipe about an alignment axis. A backup arm includes a backup arm jaws for selectively gripping the first pipe, and a torque arm including a torque arm jaws for selectively gripping the second pipe. An actuator connected to the torque arm and the backup arm causes relative movement of the torque arm with respect to the backup arm transverse to the alignment axis, thereby causing relative rotation of the second pipe with respect to the first pipe about the alignment axis. A torque slider movably captured on the backup arm selectively adjusts a connection point between the actuator and the backup arm to adjust the relative movement of the torque arm with respect to the backup arm caused by extension and retraction of the actuator.

According to another alternative aspect of the present invention, the provided assembly may be easily transported in sub-components, and may be used by an individual in an elevated condition (such as in a lift or basket or picker) where there are low weight limits.

According to another alternative aspect of the present invention there is provided a torque slider tong assembly provides a safe, convenient, light weight, portable, hand-operable dual pipe wrench for use in makeup and breakout of tubular connections. The torque-slider tong assembly includes a backup arm forming a first pipe wrench gripping a first pipe, a torque arm forming a second pipe wrench gripping a second pipe, and an actuator providing motive force moving the torque arm relative to the backup arm transverse to the pipes, which rotates the pipes relative to each other. A torque slider adjustably connects the actuator to the backup arm to adjust the mechanical advantage between the backup arm and the torque arm providing additional setup flexibility. Similarly, a movable pivot point, such as a clevis, adjustably connects the actuator to the torque arm providing additional setup flexibility. Quick-change pins allow positional adjustment of multiple components by hand after removal of split pins commonly known as cotter pins in the mechanical arts, or as safety pins, or otherwise as shown herein in the illustrations. It will be understood by those of skill in this art that the phrases, cotter pin, split pin, or safety pins may be used interchangeably within the scope and spirit of the spirit invention.

In various alternative embodiments, the tool also includes a system of selectable jaws including a variety of jaw straps and backer jaws that are readily attached to and removed from the torque and backup arms. Quick-change pins connected by cotter pins make many of the tool components easily replaced using only a manual use hand tool, such as pliers or other hand tool assemble and adjust.

In one further alternative embodiment of the present invention it will be recognized that a multi shear manifold transition ties forces from the torque arm and backup arm embodiments together so that they are contained within the tool and neutral to a manual user for improved safety. These inventions allow the present invention achieve a very high maximum torque to weight ratio as the invention keeps all connecting components in double shear, or higher, as it transfers an off-center load, instead of only single shear. Furthermore, the transition doubles as a manifold which in addition to further reducing weight, when used with applicable actuators, increases tool simplicity.

In one further alternative embodiment of the present invention it will be recognized that the present invention allows a true ability to achieve full griping strength of pipes/tools independently of a torque applied. Furthermore, this independent gripping action can be made to not require any additional alternative 'loose' tools to use, such as a wrench thereby increasing safety and convenience at reduced cost. As will be additionally noted the present invention allows additional actuators, one on each arm, to create an independent grip, for ease of use and/or to achieve a measured grip when working with sensitive components.

In one further alternative embodiment of the present invention it will be recognized that a the present invention allows a convenient modularly change to both the gripping mechanism and jaw. This allows the present invention to have a higher effective outer diameter range then other self-contained wrenches or other hand tools, and also allows the present invention to be quickly be configured to exactly suit the application and type of pipe or object at hand. These optional and adaptive improvements include a three way directional chain grip (right-hand specific, left-hand specific, or bi-directional gripping by simply flipping the chain front to back or inside to outside). A further improvement includes a rocking jaw parallel grip which allows for convenient replacement of a flexible chain with a stiff frame housing a rocking jaw held parallel to the main jaw, which allows for ease of use. A further improvement includes an indexing chain allowing for a specified indexed amount of chain to be used at once following a specification or other requirement. This means that whenever changing from one outer diameter (OD) to another the chain can simply be indexed, up to its maximum length, to accommodate the large OD size rather than having to manually add/remove chain sections. Another alternative adaptive improvement includes rubber jaw and an optional reinforced belt use thereby eliminating all metal contact for sensitive component operations a stiff rubber jaw is used in place of a metal jaw and a reinforced rubber belt is used instead of a metal chain.

A further alternative embodiment of the present invention recognizes an ambidextrous utility wherein the device is able to be operated in reverse (or 'flipped' as will be understood throughout to represent operation in a reverse direction) so that when activated a push stroke of the cylinder makes the device create clockwise torque rather than counterclockwise torque. This is advantageous as the present invention first allows both makeup and breakout operations to achieve the torque. For example the actuators (for example the hydraulic or linear actuator) may be operated in either direction. Secondly, the present constructions allows for tool free transition, and a full utility, when working with applications that have left hand threads. Finally, there is an alternative benefit wherein alternative aspects of the invention allow the assembly to be reverse aligned on a workpiece, with torque application in the opposite/different/opposing direction, which is advantageous when trying to fit it into tight spaces.

In further alternative aspects of the present invention there is provided an integrated power operation wherein the present invention allows designed backup arms and the ability to incorporate various integrated power systems into the tool itself without sacrificing capabilities or maximum torque of the unit for improved convenience, weight, safety and speed of use. For instance the backup arm can be made with an integrated hydraulic pump, hydraulic oil reservoir, and gauge for the hydraulically actuated version. A compressed gas tank, gauge, and regulator for the pneumatic version; or a battery pack, controller, and charge port for the electric version. Furthermore, all of these integrated powered backup arms can also be modified to include incorporated direct torque readouts/recordings allowing the torque being applied by the machine to be accurately measured to prevent over-torquing, and recorded as needed for quality reports. A further alternative advantage is the ability and precision in determining applied torque is dependent on the angle between the arm and the actuator using an angle gauge for determining the exact angle target torque is reached to ensure it is within tolerance, when working on high precision applications.

A further alternative and adaptive aspect of the present invention provides a stabilizing cross connection pivot wherein, one aspect of the invention herein is designed to work with a cross connecting pivot that stabilizes the distance between the two arms at all times, without interfering with its operation or distorting torque readings thereby providing alignment and safety enhancements.

A further alternative and adaptive aspect of the present invention also allows for a non-sparking construction wherein the assembly may be primarily made out of aluminum, or non-ferrous material, and built with no loose steel-to-steel contact points so that there is no tendency to spark without sacrificing capabilities or maximum torque of the unit, when working in potentially explosive environments. A further alternative and adaptive aspect of the present invention allows for non-conductive arrangements where not only can the jaw and chain be replaced with nonconductive alternatives the arms, transition, and actuator can be replaced with non-conductive ones, such as 'e-grade' safety composites, without sacrificing capabilities or maximum torque of the unit, when working around high voltage equipment. As a further alternative and adaptive embodiment there is provided an extreme diameter off-set ability, wherein the present assembly can adjust itself to handle 24+ inches of diameter difference, without sacrificing capabilities or maximum torque of the unit.

A further alternative and adaptive aspect of the present invention allows for a wide angle indexing ability by adding a set of additional holes to the makeup arm wide angle operations, notably breakouts, are allowed, without having to reset the chain/belt grips. Using the extra mounting holes on both arms, the transition and actuator can be slid and adjusted forward by simply adjusting a few pins manually. Therefore the assembly can do the initial breakout in its default position, and then by using the other mounting holes to reposition closer to the pivot axis to get better mechanical advantage, after said initial breakout. Selected embodiments of the present invention can use this indexing ability to achieve up to 70° of throw without resetting the grips instead of just 230 and these degrees may be varied as will be understood upon study of the present invention.

According to another alternative embodiment of the present invention, there is provided a tong assembly for rotating a first pipe with respect to a second pipe about an alignment axis, comprising: a backup arm comprising a backup arm jaws for selectively gripping the first pipe, a torque arm comprising a torque arm jaws for selectively gripping the second pipe, an actuator connected to the torque arm and the backup arm for causing relative movement of the torque arm with respect to the backup arm transverse to the alignment axis, thereby causing relative rotation of the second pipe with respect to the first pipe about the alignment axis, a torque slider movably captured on the backup arm for selectively adjusting a connection point between the actuator and the backup arm for adjusting the relative movement of the torque arm with respect to the backup arm transverse to the alignment axis caused by extension and retraction of the actuator.

According to another alternative embodiment of the present invention, there is provided a tong assembly further comprising a pivot point movably connected to the torque arm for selectively adjusting a connection point between the actuator and the torque arm for adjusting the relative movement of the torque arm with respect to the backup arm transverse to the alignment axis caused by extension and retraction of the actuator.

According to another alternative embodiment of the present invention, there is provided a tong assembly further comprising torque slider quick-change position pins for adjusting the connection point between the actuator and the torque slider by hand.

According to another alternative embodiment of the present invention, there is provided a tong assembly wherein the torque arm jaws further comprises a torque arm jaw strap, a torque arm backer jaw, and a torque arm tensioner for selectively tightening and loosening the second pipe between the torque arm jaw strap and the torque arm backer jaw.

According to another alternative embodiment of the present invention, there is provided a tong assembly further comprising quick-release chain pins for removing the torque arm jaw strap from the torque arm by hand.

According to another alternative embodiment of the present invention, there is provided a tong assembly further comprising a quick-release backer jaw pin for removing the torque arm backer jaw from the backup arm by hand.

According to another alternative embodiment of the present invention, there is provided a tong assembly wherein the backup arm jaws further comprises a backup arm jaw strap, a backup arm backer jaw, and a backup jaw tensioner for selectively tightening and loosening the second pipe between the backup arm tooth jaw strap and the backup arm backer jaw.

According to another alternative embodiment of the present invention, there is provided a tong assembly further comprising quick-change chain pins for removing the backup arm jaw strap from the backup arm by hand.

According to another alternative embodiment of the present invention, there is provided a tong assembly wherein and torque arm jaw strap and the backup arm jaw strap are selected from the group consisting of a chain comprising links with pipe gripping teeth in one side, a reversible chain comprising links with pipe gripping teeth in two sides, and a non-metallic belt.

According to another alternative embodiment of the present invention, there is provided a tong assembly wherein the actuator is selected from the group consisting of a hydraulic actuator, a turnbuckle ratchet actuator, a pneumatic actuator, a hydraulic actuator, an electric actuator, and a scissors actuator.

According to another alternative embodiment of the present invention, there is provided a tong assembly, further comprising, a backup arm jaws tensioner for selectively tightening the backup arm jaws on the first pipe, and a torque arm jaws tensioner for selectively tightening the torque arm jaws on the second pipe.

According to another alternative embodiment of the present invention, there is provided a tong assembly wherein the torque arm jaws or the backup arm jaws tensioner further comprises a clevis, a threaded rod extending through the clevis, and captured nut carried on the threaded rod positioned within the clevis.

According to another alternative embodiment of the present invention, there is provided a tong assembly, wherein the torque arm jaws or the backup arm jaws tensioner further comprises a ratchet captured on the captured for adjusting the torque arm jaws or the backup arm jaws tensioner by hand without using tools.

According to another alternative embodiment of the present invention, there is provided a tong assembly wherein: the actuator is a hydraulic actuator, and the backup arm further comprises a hydraulic pump, hydraulic reservoir, hydraulic gauge, and hydraulic hoses operably connecting the backup arm to the hydraulic actuator.

According to another alternative embodiment of the present invention, there is provided a tong assembly wherein: the actuator is a pneumatic actuator, and the backup arm further comprises a pneumatic pump, pneumatic reservoir, pneumatic gauge, and pneumatic hoses operably connecting the backup arm to the pneumatic actuator.

According to another alternative embodiment of the present invention, there is provided a tong assembly wherein: the actuator is an electric actuator, and the backup arm further comprises an electric battery receptacle and electric wires operably connecting the backup arm to the electric actuator.

According to another alternative embodiment of the present invention, there is provided a tong assembly, further comprising a torque angel gauge disposed at a pivot point between the torque arm and the actuator.

According to another alternative embodiment of the present invention, there is provided a tong assembly further comprising a cross-arm stabilizer extending between the torque arm and the backup arm.

According to another alternative embodiment of the present invention, there is provided a tong assembly system for rotating a first pipe with respect to a second pipe about an alignment axis, comprising: a tong assembly comprising a backup arm further comprising a backup arm jaw for selectively gripping the first pipe, a torque arm comprising a torque arm jaws for selectively gripping the second pipe, an actuator connected to the torque arm and the backup arm for causing relative movement of the torque arm with respect to the backup arm transverse to the alignment axis, thereby causing relative rotation of the second pipe with respect to the first pipe about the alignment axis, and a torque slider movably captured on the backup arm for selectively adjusting a connection point between the actuator and the backup arm for adjusting the relative movement of the torque arm with respect to the backup arm transverse to the alignment axis caused by extension and retraction of the actuator, a system of selectable backup arm jaws comprising a plurality of backup arm jaw straps removably attachable to the backup arm, and a plurality of backup arm backer jaws removably attachable to the backup arm.

a system of selectable torque arm jaws comprising a plurality of torque arm jaw straps removably attachable to the torque arm, and a plurality of torque arm backer jaws removably attachable to the torque arm.

It will be understood that specific embodiments may include a variety of features and options in different combinations, as may be desired by different users. Practicing the invention does not require utilization of all, or any particular combination, of these specific features or options. Selected and optional techniques and structures of the present invention for implementing particular embodiments of the invention and accomplishing the associated advantages will become apparent from the following detailed description of the embodiments and the appended drawings and claims.

BRIEF DESCRIPTION OF THE FIGURES

The numerous advantages of the embodiments of the invention may be better understood with reference to the representative embodiments shown in the accompanying figures.

DETAILED DESCRIPTION OF EMBODIMENTS

Figure 1A:
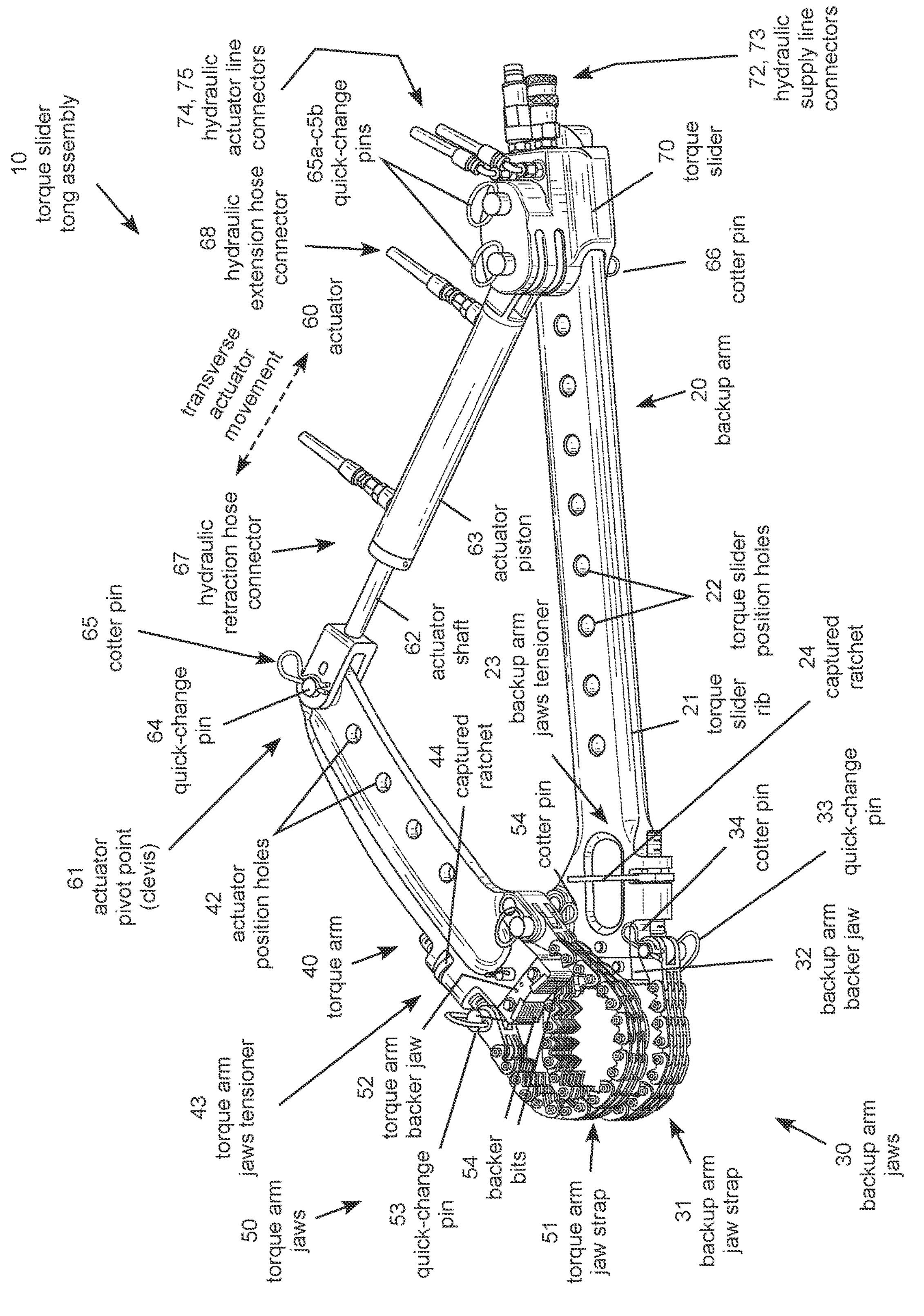
FIG. 1A is a perspective view of a torque slider tong assembly.

Embodiments of the invention include a wide range of torque slider tong assemblies, with a various configurations, features and options, providing light weight, portable, hand-operable dual pipe wrenches for use in makeup and breakout of tubular connections. The torque-slider tong assembly includes a backup arm forming a first pipe wrench gripping a first pipe, a torque arm forming a second pipe wrench gripping a second pipe, and an actuator providing motive force moving the torque arm relative to the backup arm transverse to the pipes, which rotates the pipes relative to each other. The torque slider connecting the actuator to the backup arm can be easily anchored at different locations on the backup arm to adjust the mechanical advantage between the backup arm and the torque arm providing advantageous setup flexibility. Similarly, a movable pivot point, such as a clevis, adjustably connecting the actuator to the torque arm provides additional setup flexibility. The torque slider and clevis may be connected to the backup arm and the torque arm, respectively, with quick-change pins allowing positional adjustment by hand after removal of cotter pins, typically with an ordinary pliers. In an embodiment with a hydraulic actuator, the torque slider also serves as a hydraulic manifold interconnecting local actuator hoses hydraulic supply lines.

The backup and torque arms each include a jaws formed by jaw strap, a backer jaw, and a tensioner that tightens the jaws on the pipe. The jaw straps, backer jaws and backer bits are all removable and replaceable with a wide range of options. For example, the jaw straps options includes metallic tooth chains, reversable double-sided leaf chains, diamond-tipped tooth chains, non-metallic reinforced belts, and so forth. A range of options are also available for the backer jaws and associated backer bits. A range of options are also available for the jaw strap tensioners, such as clevis rods with captured nuts and captured ratchets for tool-free tensioner operation. Other tensioner options include cam tensioners, actuated tensioners, adjustable chain length adapters, and so forth. Another option utilizes quick-change pins allowing removal and replacement of the jaw straps and backer jaws by hand.

The torque slider tong assembly is a self-contained dial pipe wrench, in which the reaction force of the wrench applying torque are countered by the tool itself, thus containing them, and preventing reaction torque from being applied to the user. The dual pipe wrench has unique design elements giving the wrench superior torque, relative to tool size/weight; additionally the tool has several other unique attributes that greatly expand its overall functionality. The ability to modularly change both the gripping mechanisms and jaws is unique to the torque slider tong assembly, allowing the dual pipe wrench to grip pipes with highly variable outer diameters relative to overall tool size. The modular design also allows the dual pipe wrench to be quickly be configured to exactly suit the application at hand, typically without need for tools other than a common hand tools.

The torque slider ties the motive force produced by the actuator to the arms of the wrench, converting the transverse force applied to the arms into differential rotational torque applied to the pipes. The torque slider simultaneously allows the option for the component to slide, or otherwise be moved along the backer arm, allowing the wrench to be adapted for different operations and conditions, without sacrificing capabilities or maximum torque of the unit. This unique design component can be combined with numerous customizations, such a hydraulic manifold built into the torque slider, integrated power options, stabilizer brackets, and other features and options achieving superior torque and utility relative to size and weight of the tool. Although the torque slider is most commonly mounted on the backup arm, it should be noted that the dual pipe wrench design can be adapted to have a torque slider on the torque arm instead, as well as having torque sliders for both arm, and even compound torque sliders on torque sliders.

The torque slider tong assembly is a unique self-contained dual pipe wrench design in that it offers the ability to achieve full griping strength of the jaws on the pipes independently of the torque applied, instead of only achieving full grip strength when torque is applied, thus making this dual pipe wrench well suited for positioning and steadying type operations. Furthermore, the independent gripping action can be made adjustable, and replaceable, without tools, other than hand tools, for added convenience and speed of setup. Additionally, the tool be fitted with different types of tensioner, including tensioner actuators, for ease of use and control over the grip strength.

The modular gripping option include a three-way directional chain grip, which can be configured for right-hand specific, left-hand specific, or bi-directional gripping by simply reversing the chain front to back or inside to outside. A rocking jaw parallel grip can replace the flexible chain with a special-purpose end effector, such as a stiff frame housing with a rocking jaw held parallel to the main jaw, which allows for ease of use in certain applications. An optional chain length adapter provides chain length indexing allowing a selected amount of the to be connected in the jaw strap. This allows the chain length to be easily indexed whenever changing from one OD to another, up to its maximum length pf the chain, to accommodate the large OD pipe sizes rather than having to manually replace the chain or add links to the chain. As another option, the jaw strap may be reinforced non-metallic belt eliminating all metal contact for spark-free and sensitive component operations. Similarly, the backer jaw or its backer bits may be replaced with non-metallic options for spark-free and sensitive component operations.

The torque slider tong assembly is ambidextrous, in that the tool can be flipped so that when activated the push stroke of the actuator creates left-hand rather than right-hand torque. This is advantageous allowing both makeup and breakout operations to achieve the same torque. This capability also allows for tool free transition, and full utility, when working with applications that have left hand threads. Ambidextrous operability also allows the tool be operated in reverse on a workpiece, without any loss in torque, which is advantages when trying to fit the tool into tight spaces.

While simpler and lighter when powered from external power sources of some kind, notably hydraulic power, a unique attribute of the torque slider tong assembly is the ability to incorporate various integrated power systems directly into the tool itself without sacrificing capabilities or maximum torque of the unit. For instance the tool can be made with an integrated hydraulic pump, hydraulic oil reservoir, and gauge for a self-contained hydraulically actuated version. A compressed gas tank, gauge, and regulator for a self-contained pneumatic version; or a battery pack, controller, and charge port for a self-contained electric version. Furthermore, all of these integrated powered versions can also be modified to include direct torque readouts and recordings allowing the torque applied by the tool to be accurately measured and automatically limited to prevent over-torquing. Torque applied, operations conducted, GPS work locations, tag readings, inventory management, time and materials, and other types of work reports can be recorded and readout as desired.

As precision in determining applied torque is dependent on the angle between the arm and the actuator, the tool features an angle gauge for determining the exact angle target torque is reached to ensure it is within tolerance, when working on high precision applications.

Addressing the complication of keeping one arm a certain distance from the other arm, as well as other alignment issues, when initially placing a self-contained wrench on the pipe, the torque slider tong assembly is specifically designed to work with various cross connecting pivots that stabilize the distance between the two arms, without interfering with its operation or distorting torque readings.

Although the base units are made out of aluminum and built with no loose steel-to-steel contact points with no tendency to spark in its default configuration all or portions of the tools may be fabricated from a range of materials including steel and non-metallic materials, such as high density polymers, carbon fiber composites, polymer-ceramic composites, and so forth. All steel and other potentially sparking components can be replaced with noon-metallic, non-sparking alternatives to ensure the tool cannot spark when struck against a hard surface, without sacrificing capabilities or maximum torque of the unit, when working in potentially explosive environments. Not only can the jaw strap and backer jaw be replaced with non-conductive alternatives, the arms, torque slider, and actuator can be replaced with non-conductive materials, such as non-conductive plastics and composites, without sacrificing capabilities or maximum torque of the unit, when working around high voltage equipment.

On its backup arm, the torque slider tong assembly can make use of a set of additional mounting holes for positioning the torque slider, thereby allowing the dual pipe wrench to be adjusted to handle extremely large differences in diameter, compared to the relative size of the tool, without sacrificing capabilities or maximum torque of the unit.

By utilizing sets of additional holes on the arms, the actuator can be connected to different connection points along the arms. The torque slider facilitates the process to achieve superior wide angle operations, allowing the wrench to torque workpieces to angles much greater than the initial actuator operation was able to produce, without having to reset the grips on the work piece. For example, a feature that is notably useful for breakouts is accomplished by sequentially moving the torque slider on the backup arm, and/or the opposing pivot point on the torque arm, to additional holes. This sequentially moves the actuator connection points closer to the pivot axis to improve mechanical advantage. At each connection point, the actuator is operated to take advantage of the increased mechanical advantage, achieving a greater angle of throw without resetting the grips.

Reference will now be made in detail to embodiments of the invention. In general, the same or similar reference numerals are used in the drawings and the description to refer to the same or like parts or steps. The drawings are in simplified form and are not to precise scale unless specifically indicated. The word "couple" and similar terms do not necessarily denote direct and immediate connections, but also include connections through intermediate elements or devices. Certain descriptors, such "first" and "second", "top and bottom", "upper" and "lower", or "inner" and "outer" may be employed to differentiate structures from each other. These descriptors are utilized as a matter of descriptive convenience and are not employed to implicitly limit the invention to any particular position or orientation.

FIG. 1A is a perspective view of a representative embodiment of the torque slider tong assembly 10, which includes a backup arm 20 with a backup arm jaws 30, a torque arm 40 with a torque arm jaws 50, and an actuator 60 connecting the backup arm to the torque arm. For tubular makeup and breakout, the backup arm jaws 30 and the torque arm jaws 50 firmly grip first and second pipes, respectively, end-to-end along an alignment axis. The actuator 60 causes relative motion of the torque arm 40 with respect to the backup arm 20 transverse to the axis of pipe alignment, which translates into relative rotational motion of the torque arm jaws 50 with respect to the backup arm jaws 30, in turn causing differential motion of the pipes. In the view shown in FIG. 1, expansion of the actuator 60 causes clockwise relative motion of the pipes for breakout of right-hand threaded pipes (or makeup of left-hand threaded pipes). The torque slider tong assembly 10 can be operated in reverse so that expansion of the actuator 60 causes counterclockwise relative motion of the pipes for makeup of right-hand threaded pipes (or breakout of left-hand threaded pipes). The torque slider tong assembly 10 preferably weighs less than 50 lbs with the backup arm 20, torque arm 40, and actuator 60 sized to be grasped, carried and positioned by hand. As a result, the torque slider tong assembly 10 is, in many respects, a reduced size, light-weight, hand-operated version of a conventional oil rig tongs with far greater ranges of applications, functions and options. The tool may be available in various size options. For example, in one embodiment the backup arm 20 may be approximately 18-inches long, in another embodiment the backup arm may be approximately 30-inches long, and in another embodiment the backup arm may be approximately 42-inches long with the other components shown approximately to scale.

The torque slider 70 slidably captured on the backup arm allows the position of the connection point between the actuator 60 and the backup arm 20 to be readily changed in the field, changing the mechanical advantage, the torque created, the transverse throw, and the differential rotational motion caused by expansion of the actuator. Similarly, a movable pivot point 61, in this example a clevis, allows the position of the connection point between the actuator 60 and the torque arm 40 to be readily changed in the field, changing the mechanical advantage, the torque created, the transverse throw, and the differential rotation caused by expansion of the actuator. The connections points of the actuator 60 on the backup arm 20 and the torque arm 40 can be changed iteratively, and in tandem, providing a wide range of positional indexing of the leverage setup.

In this particular embodiment, the backup arm 20 includes a rib 21 that captures the torque slider 70 on the backup arm. A number of torque slider holes 22 provide for positioning the torque slider 70 at a variety of locations along the backup arm. The backup arm 20 also includes a backup arm jaws tensioner 23, in this example a hosel element defining and bounding a part of a clevis (as shown) receiving a tensioner bolt, and a captured nut carried on the tensioner bolt positioned in the clevis. This particular embodiment also includes a captured ratchet 24 on the captured nut allowing tool-free adjustment of the jaws tensioner 23. Other types of tensioners may be utilized, a representative selection of which are illustrated in subsequent drawings. As shown herein the hosel structure (for example see hosel 46 FIG. 7) provides an extending shoulder element from the torque arm to operate as a clevis as shown.

The torque sider 70 slides onto the distal end (right in FIG. 1A) of the backup arm 20, while the backup arm jaws 30 is located at the proximal end (left in FIG. 1A) of the backup arm. The backup arm jaws 30 includes backup arm jaw strap 31 and a backup arm backer jaw 32. In this embodiment, a quick-change pin 33 connects the backup arm jaw strap 31 a first anchor point in the backup arm jaws tensioner 23. A similar quick-change pin, not shown in this view, connects the other end of the backup arm jaw strap 31 to another anchor point on the backup arm 20. As discussed herein above, a pair of split pins or safety pins most commonly called cotter pins in the art, and represented by the visible cotter pin 34, are typically removed by hand or with hand tools. The backup arm jaw strap 31 can then be easily removed and replaced by hand without the use of additional tools. The backup arm backer jaw 32 can similarly be removed and replaced via a quick change pin held in place by a cotter pin 34, which are not visible in this view. The backup arm backer jaw 32 includes a pair of backer bits 54, 54, which are partially visible in this view, that can be removed and replaced independently of the backup arm backer jaw 32 itself.

Similar to the backup arm 20, the torque arm 40 includes a number of actuator arm position holes 42 for selectively positioning an actuator pivot point 61, in this example a clevis, along the torque arm. The torque arm 40 also includes a torque arm jaws tensioner 43, in this example a hosel (or a clevis portion) defining a clevis receiving a tensioner bolt, and a captured nut carried on the tensioner bolt positioned in the clevis. This particular embodiment also includes a captured ratchet 44 on the captured nut allowing tool-free adjustment of the tensioner 43.

The actuator pivot point 61 is located at the distal end (right in FIG. 1A) of the torque arm 40 in this view, while the torque arm jaws 50 is located at the proximal end (left in FIG. 1A) of the torque arm. Like the backup arm jaws, the torque arm jaws 50 includes a torque arm jaw strap 51 and a torque arm backer jaw 52. In this embodiment, a quick-change pin 53 connects the torque arm jaw strap 51 to the torque arm jaws tensioner 43. A similar quick-change pin, visible but not labeled in this view, connects the other end of the torque arm jaw strap 51 to the torque arm 40. A pair of cotter pins, represented by the visible cotter pin 54, are readily removed. The torque arm jaw strap 51 can then be easily removed and replaced by hand without the use of additional tools. The torque arm backer jaw 52 can be similarly be removed and replaced via a quick change pin (see quick-change pin 53*c* in FIG. 7) may optionally be held in place by a split pin or cotter pin, which is not visible in this view. The torque arm backer jaw 52 includes a pair of backer bits 54, that can be removed and replaced independently of the backup arm backer jaw 52 itself.

This particular embodiment includes a hydraulic actuator 60 with a pivot point 61, a clevis in this example, connected to the actuator shaft 62, which is extended and retracted by the actuator piston 63. A quick-change pin 64 held in place by a cotter pin 65 removably attaches the pivot point 61 to the torque arm 40, which can be easily relocated to the other actuator position holes 42 by hand after removal of the cotter pin 65. Similarly, a pair of quick-change pins 65*a*-65*b* held in place by cotter pins (cotter pin 66 is partially visible in this view) removably attach the actuator piston 63 to the torque slider 70, which can be easily relocated to the other torque slider position holes 42 by hand. The actuator piston 63 includes a hydraulic retraction hose connector 67 and a hydraulic extension hose connector 68. In this embodiment, the torque slider 70 also servs as a hydraulic manifold with hydraulic supply line connectors 72, 73 and hydraulic actuator hose connectors 74, 75. Local hydraulic hoses connect the actuator piston hose connectors 67, 68 to the actuator hose connectors 74, 75 on the torque slider 70.

The backup arm jaw strap 31 and torque arm jaw strap 51 are easily removed and replaced with a system of modular jaw straps with different features. For example, interchangeable jaw straps include single-sided tooth chains, double-sided (reversible) leaf chains, reinforced non-metallic straps, and strap with teeth on one side and non-metallic pads on the other. Tooth chains can include different types of teeth designed to grip different types of pipes, such as high-carbon steel, stainless steel, titanium, tungsten, diamond, ceramic, and so forth. Non-metallic straps, such as reinforced rubber, carbon composite, nylon, para-aramid (Kevlar), high-modulus polyethylene, can be used to provide non-sparking and electrically non-conductive options. A similar range of options is available for the backup arm backer jaw 32 and its associated backer bits 54, as wells as the torque arm backer jaw 52 and its associated backer bits 54.

In the same vein, the hydraulic actuator 60 is easily removed and replaced with a system of modular actuators with different motive forces and features. For example, other types of interchangeable actuators include pneumatic actuators, electric actuators, scissors actuators, cylinders, trunyon cylinders, and so forth, without limit to a particular geometry (e.g., ‘cylinders’ such as 228, 238, 248 etc. may have any shape at all) so that they may be any effective form of actuator to function as intended herein. In some embodiments, the actuator is fully integrated into the tool, while other alternatives attach to external power sources. Many other features and options may be incorporated into the torque slider tong assembly. For example, a dual torque slider embodiment includes torque sliders captured on both the torque arm and the backup arm. A completely spark-free embodiment is fabricated entirely or mostly from non-metallic components. Specialty embodiments may include specialized end effectors instead of strap jaws generally used to makeup and breakout tubular connections. A representative, but by no means exclusive, sampling of these alternative embodiments are shown is the following drawings.

Figure 1B:
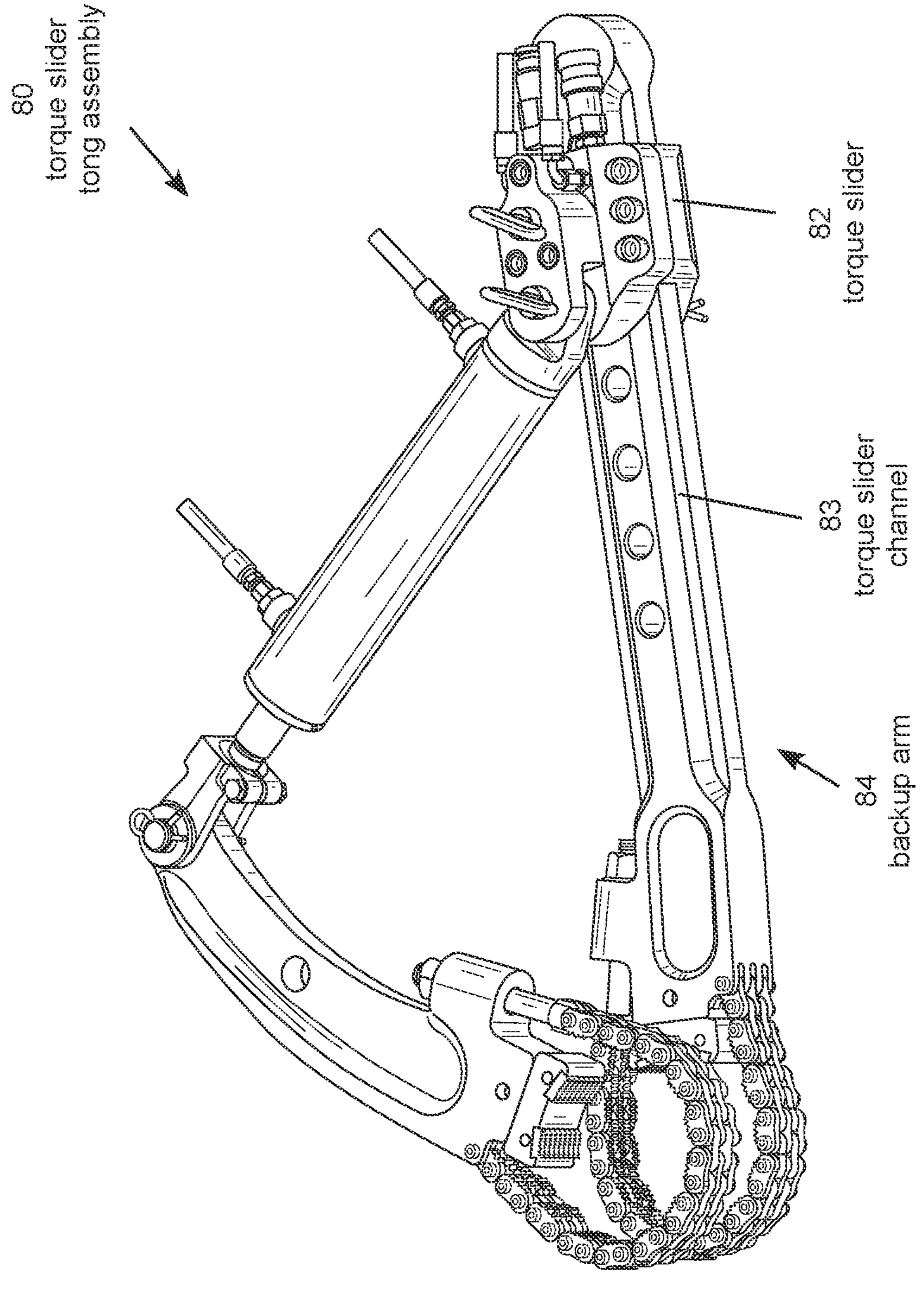
FIG. 1B is a perspective view of a variation of the torque slider tong assembly with a torque slider channel.

FIG. 1B is a perspective view of a variation of the torque slider tong assembly 80 with an alternative torque slider 82 that is captured in a torque slider channel 83 formed into the backup arm 84. This embodiment may include a ball bearing race on the bottom of the torque slider 82 to facilitate movement of the torque slider along the channel 83 and reduce wear.

Figure 2:
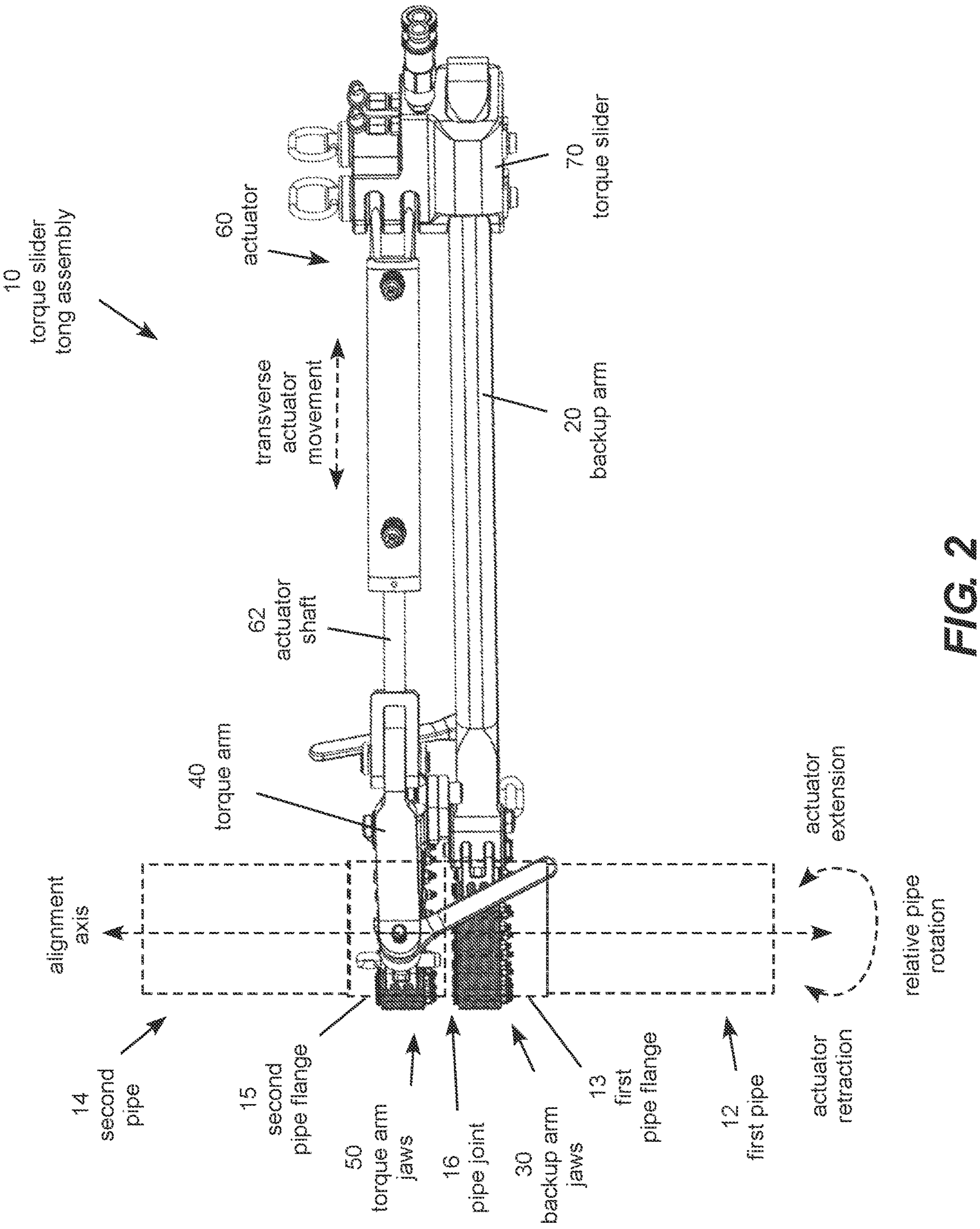
FIG. 2 is a side view of the torque slider tong assembly operably attached to first and second pipes.

FIG. 2 is a side view of the torque slider tong assembly 10 operably attached to first and second pipes 12, 14. The first pipe 12 includes a first pipe flange 13, while the second pipe 14 includes a second pipe flange 15. The first and second pipe flanges 12, 14 meet each other end-to-end at a pipe joint 16 with the first and second pipes 12, 14 aligned with each other along an alignment axis. The first and second pipes 12, 14 threadably engage or otherwise connect to each other at the pipe joint 16. The pipes are not yet connected to each other for a pipe makeup operation, while they are already connected to each other (e.g., threadably screwed together) for a pipe breakout operation. In either case, the backup arm 20 is positioned transverse to the alignment axis with the backup arm jaws 30 tightened on the first pipe flange 13. Similarly, the torque arm 40 is positioned transverse to the alignment axis with the torque arm jaws 50 tightened on the second pipe flange 15, with the pipe joint 16 located between the backup arm jaws 30 and the torque arm jaws 50. The operator activates the actuator 60 to extend the actuator shaft 62, which moves the torque arm 40 relative to the backup arm 20 transverse to the alignment axis (to the left in FIG. 2), which in turn rotates the second pipe 14 relative to the first pipe 12 in a counterclockwise direction about the alignment axis. This effects a breakout motion for a right-hand threaded pipe joint 15. Alternatively, the operator activates the actuator 60 to retract the actuator shaft 62, which moves the torque arm 40 relative to the backup arm 20 in the opposing direction (to the right in FIG. 2) transverse to the alignment axis, which in turn rotates the second pipe 14 relative to the first pipe 12 in a clockwise direction about the alignment axis. This effects a makeup motion for a right-hand threaded pipe joint 15. The technician adjusts the position of the torque slider 70 on the backup arm 20 to adjust the mechanical advantage, theow of the torque arm 40, and differential rotation of the pipes 12, 14 caused by operation of the actuator 60.

FIGS. 3A-3B, 4A-4B and 5A-5B illustrate an advantage of the torque slider tong assembly when installing the tool for a tubular operation. The torque slider tong assembly 10 is structurally a dual pipe wrench with separable pipe wrenches, the backup arm 20 and the torque arm 40, connected by the actuator 60. Various quick-change pins make it very easy to separate these components by removal of a few cotter pins, which is typically performed with a pliers, without additional tools or disassembly required. Each pipe wrench, the backup arm 20 and the torque arm 40, can then be attached to their respective pipes separately, with the actuator installed after the pipe wrenches have ben secured in place. Of course, this installation process is optional, as the tool may be installed with the components connected together if desired.

Figures 3A, 3B, 4A, 4B, 5A, 5B:
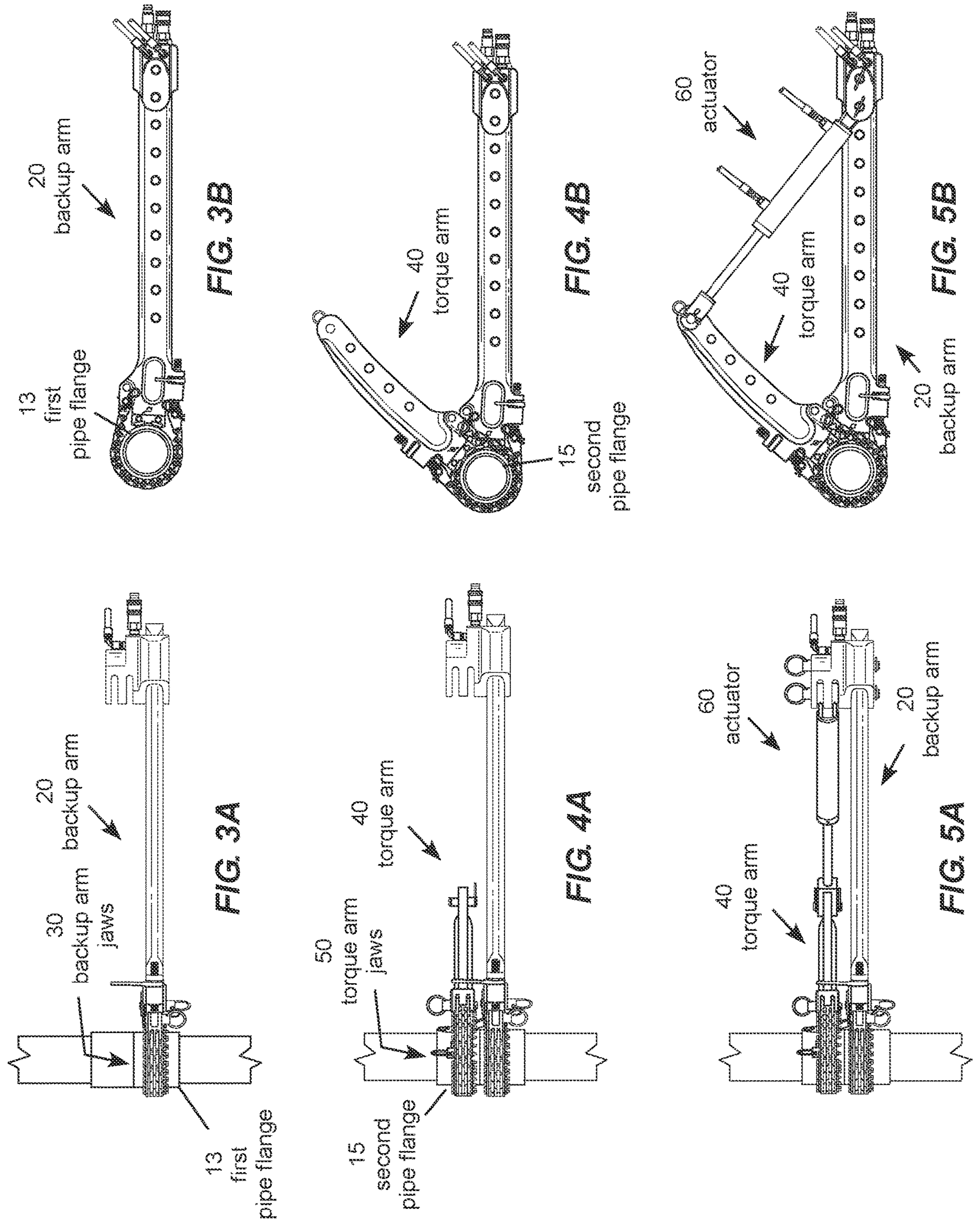
FIG. 3A is a side view of a first step in connecting the torque slider tong assembly to the first and second pipes.
FIG. 3B is a top view of the first step in connecting the torque slider tong assembly to the first and second pipes.
FIG. 4A is a side view of a second step in connecting the torque slider tong assembly to the first and second pipes.
FIG. 4B is a top view of the second step in connecting the torque slider tong assembly to the first and second pipes.
FIG. 5A is a side view of a third step in connecting the torque slider tong assembly to the first and second pipes.
FIG. 5B is a top view of the third step in connecting the torque slider tong assembly to the first and second pipes.

As an example procedure for installing the components separately, FIGS. 3A-3B are side and top views illustrating the first step, in which the backup arm 20 is installed on the first pipe flange 13. This is typically accomplished by removing a quick-change pin to detach one end of the backup arm jaw strap from the backup arm, placing the backup arm backer jaw against the first pipe flange 13, wrapping the backup jaw strap around the first pipe flange, and reinstalling the quick-change pin to reattach the detached end of the backup arm jaw strap to the backup arm. The user then tightens the backup arm jaws 30 on the first pipe flange to steady the backup arm. The operator can then let go of the backup arm to free-up hands to handle the torque arm.

FIGS. 4A-4B are side and top views illustrating the second step in which the torque arm 40 is installed on the second pipe flange 15. As with the backup jaws, this is typically accomplished by removing a quick-change pin to detach detaching one end of the torque arm jaw strap from the torque arm, placing the torque arm backer jaw against the second pipe flange 15, wrapping the torque jaw strap around the second pipe flange, and reinstalling the quick-change pin to reattach the detached end of the torque arm jaw to the torque arm. The user then tightens the torque arm jaws 50 on the second pipe flange to steady the torque arm. The operator can then let go of the torque arm to free-up hands to handle the torque arm.

FIGS. 5A-5B are side and top views illustrating the third step in which the actuator 60 is installed to interconnect the backup arm 20 with the torque arm 40. This is typically accomplished by first removing a pair of quick-change pins to free the torque slider, moving the torque slider to the desired position on the backup arm, and reinstalling the quick-change pins to lock the torque slider in the desired position. The operator removes the quick-change pin from the actuator pivot point, extends the actuator piston shaft as required to position the actuator pivot point over the desired position hole on the torque arm, and reinstalls a quick-change pin to lock the pivot point to the torque arm. The operator may also attach one or more stabilizer arms connecting the backup and torque arms together, as desired, typically using quick quick-change pins. It will be appreciated that the installation process can be completed without the use of tools other than a common pliers to remove and reinstall the cotter pins that hold the various quick-change pins in place. Of course, the operator may choose to install the torque arm before the backup arm, if desired. As another option, the operator may choose to leave actuator connected to the torque are, the backup arm, or both arms while installing the backup and torque arms on the pipes, if desired. Smaller tool may be amenable to installation on the pipes with the arm connection intact, while larger version of the tool may be more amenable to separate connection of the arms. The installation process is easily performed by a single person, or in some cases two people for larger versions of the tool.

Figure 6C:
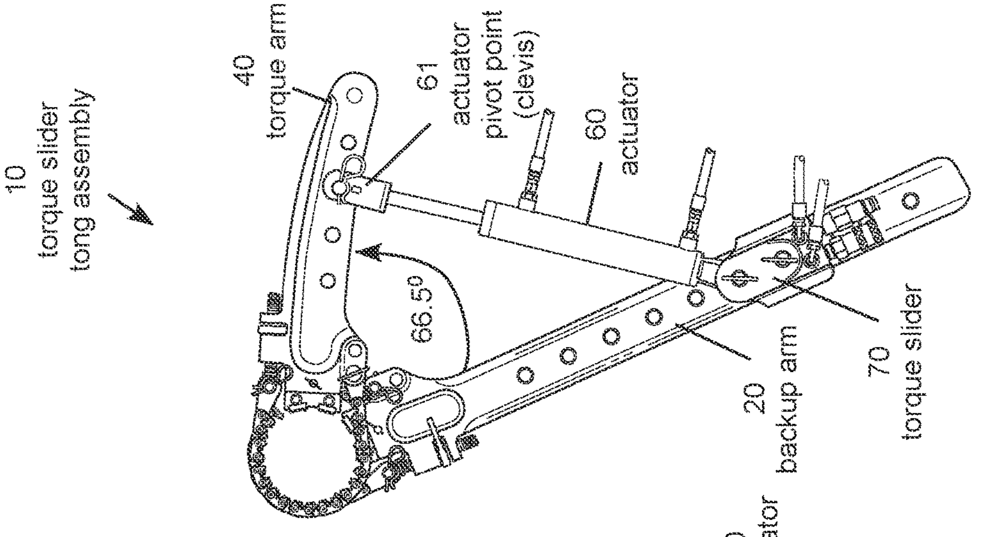
FIG. 6C is a top view of a third step in wide angle operation of the torque slider tong assembly.
Figure 6B:
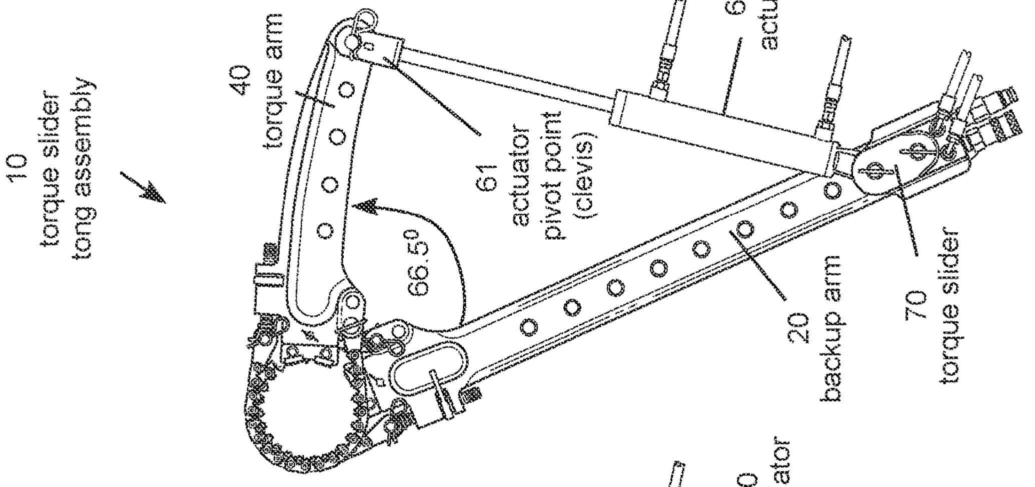
FIG. 6B is a top view of a second step in wide angle operation of the torque slider tong assembly.
Figure 6A:
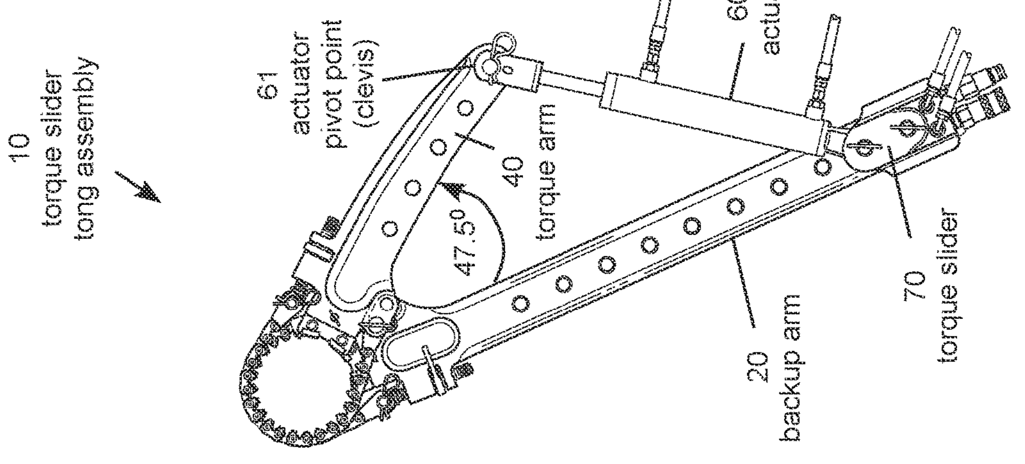
FIG. 6A is a top view of a first step in wide angle operation of the torque slider tong assembly.
Figures 6D, 6E, 6F:
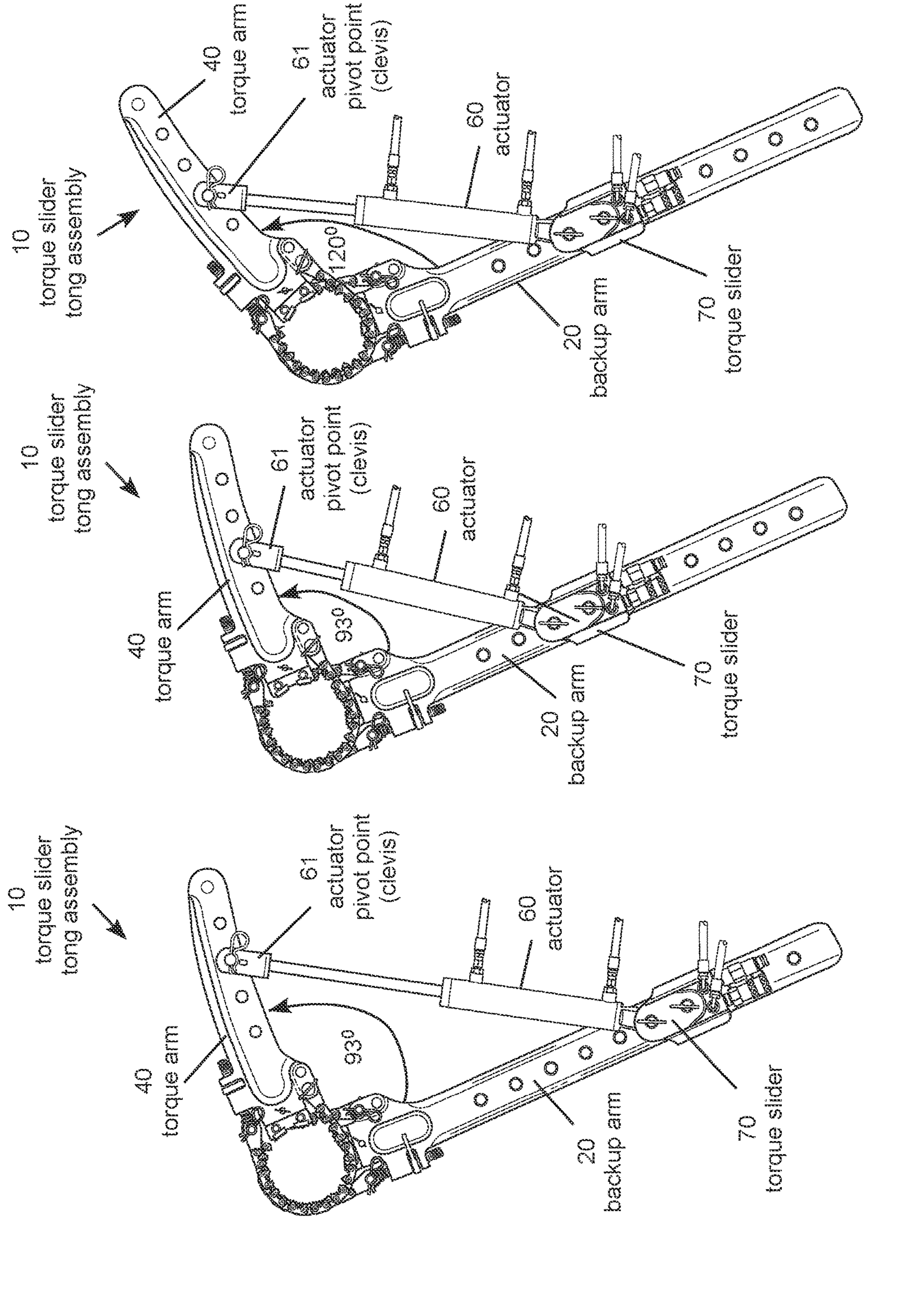
FIG. 6D is a top view of a fourth step in wide angle operation of the torque slider tong assembly.
FIG. 6E is a top view of a fifth step in wide angle operation of the torque slider tong assembly.
FIG. 6F is a top view of a sixth step in wide angle operation of the torque slider tong assembly.

FIG. 6A-6F are top views illustrating a representative example of wide angle operation of the torque slider tong assembly 10. FIG. 6A illustrates the initial setup in which the torque slider 70 is positioned at the distal end of the backup arm 20, the actuator pivot point 61 is positioned at the distal end of the torque arm 40, and the torque arm is separated from the backup arm (for example by 47.5° as shown). As shown in FIG. 6B, the operator then extends the actuator arm 60, which throws the backup arm 20 to increase the transverse angle between torque arm and the backup arm to 66.5°. Without changing the grips on the pipes, the operator, as shown in FIG. 6C, the operator moves the torque slider 70 in an intermediate position closer to the proximal end of the backup arm 20, preferably using quick-change pins to change the setup. As shown in FIG. 6D, the operator then extends the actuator arm 60 a second time, which throws the backup arm 20 a second time to increase the transverse angle between torque arm and the backup arm to 93°. Again without changing the grips on the pipes, the operator, as shown in FIG. 6E, the operator moves the torque slider 70 to a another position closer to the proximal end of the backup arm 20, again preferably using quick-change pins to change the setup. As shown in FIG. 6F, the operator then extends the actuator arm 60 a third time, which throws the backup arm 20 a third time to increase the transverse angle between torque arm and the backup arm to 120°. It will be understood by those of skill in this art, having studied the present disclosure, that modifications and variations are intended to be within the scope and spirit of the present invention.

Figure 7:
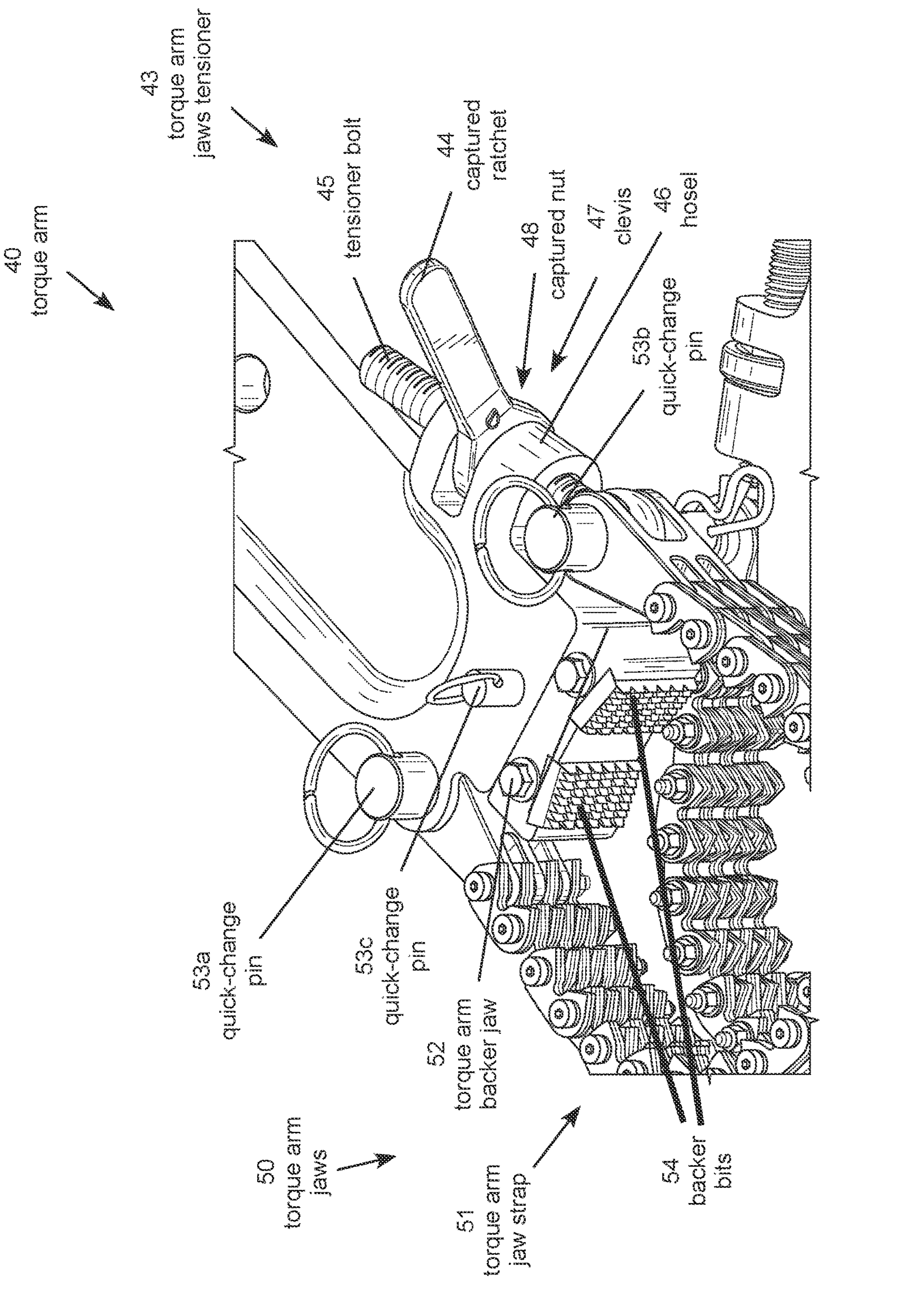
FIG. 7 is a perspective view of the backup arm jaws of the torque slider tong assembly.

FIG. 7 is a closeup perspective view of the torque arm jaws 50 showing additional detail. The torque arm jaws 50 includes three quick-change pins 53*a*-53*c* allowing the torque arm jaw strap 51 and the torque arm backer jaw 52 to be easily removed, for modular replacement. This particular example of the torque arm jaws tensioner 43 includes a tensioner bolt 45 received through a hosel 46 formed by the torque arm 40. The hosel 46 forms a clevis 47 that the tensioner bolt 45 passes through, and a captured nut 48 carried on the tensioner bolt positioned in the clevis. The torque arm jaws tensioner 43 also includes a captured ratchet 44 carried on the captured nut 48 allowing tool-free operation of the tensioner. The torque arm backer jaw 52 carries a pair of backer bits 54 that typically slide into and out of engagement with the backer jaw for easy removal and replacement while the backer jaw remains in place on the tool. The torque arm backer jaw strap 51 can be easily removed through removal of the quick-change pin 53*c*-53*b*, while the torque arm backer jaw 52 can be easily removed through removal of the quick-change pin 53*c*, to accommodate modular installation of other types of jaw straps and backer jaws.

Figure 8B:
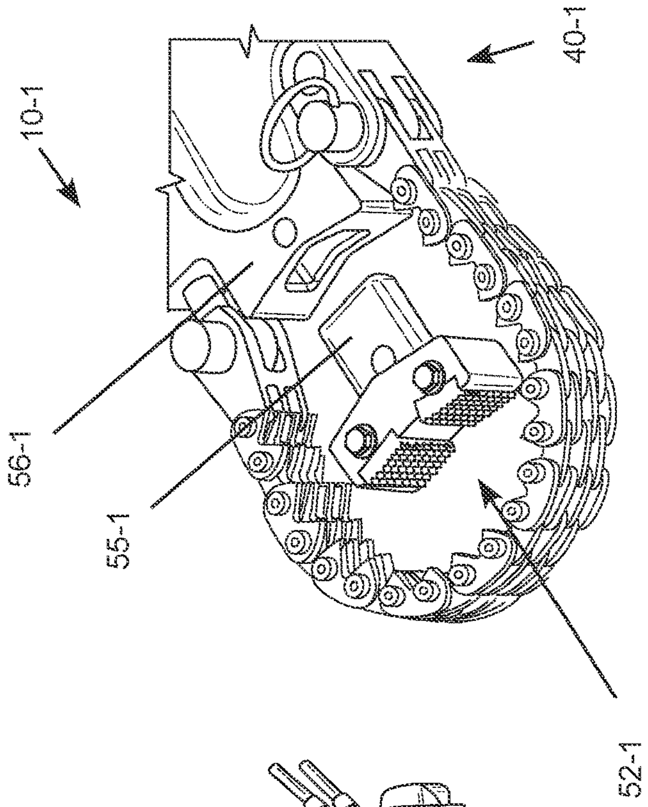
FIGS. 8A-8B are perspective views illustrating a torque slider tong assembly including a torque arm with an alternative version of the modular backer jaw.
Figure 8A:
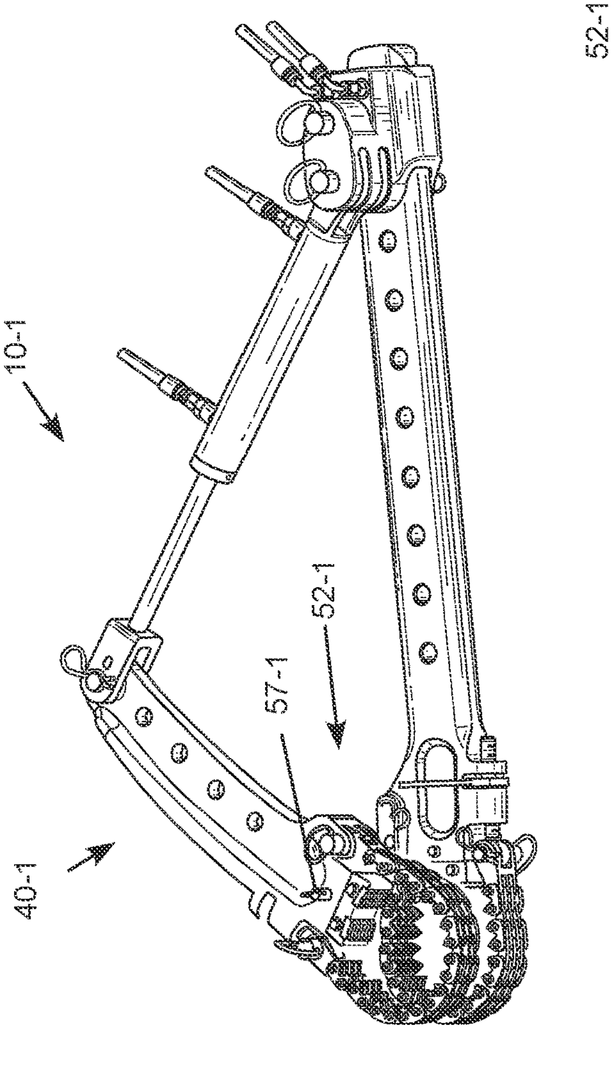

FIGS. 8A-8B are perspective views illustrating a torque slider tong assembly 10-1 including a torque arm 40-1 with an alternative version of the modular backer jaw 52-1. This particular version of the modular backer jaw includes a throat 55-1 that is removably received with in a collar 56-1. Quick-change pin 57-1 allows the modular backer jaw 52-1 to be easily removed from the throat 55-1.

Figure 9B:
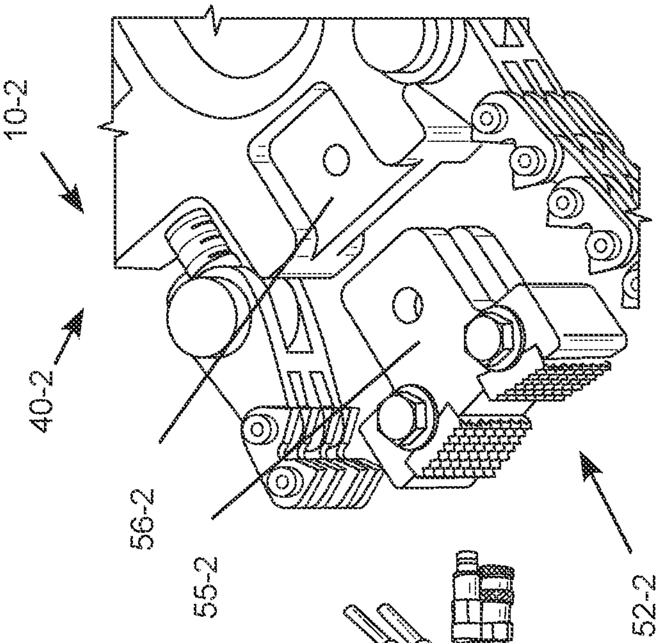
FIGS. 9A-9B are perspective views illustrating a torque slider tong assembly including a torque arm with another alternative version of the modular backer jaw.
Figure 9A:
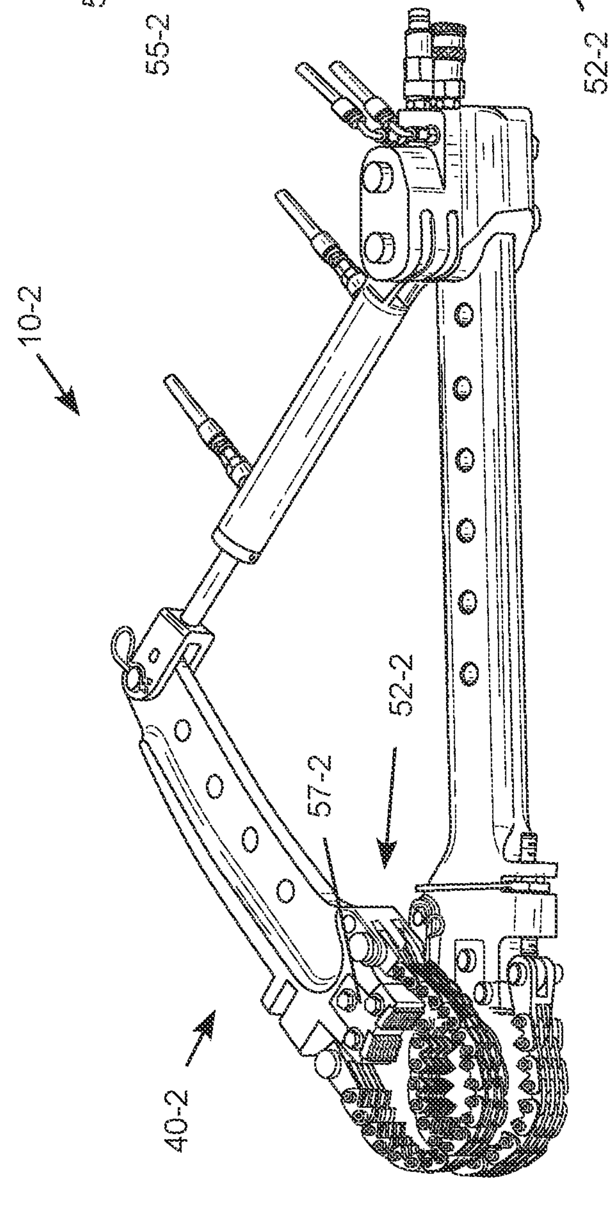

FIGS. 9A-9B are perspective views illustrating a torque slider tong assembly 10-2 including a torque arm 40-2 with an alternative version of the modular backer jaw 52-2. This particular version of the modular backer jaw includes a U-shaped clevis 55-2 that is removably received on a flange 56-2. Quick-change pin 57-2 allows the modular backer jaw 52-2 to be easily removed from the flange 56-2.

Figure 10B:
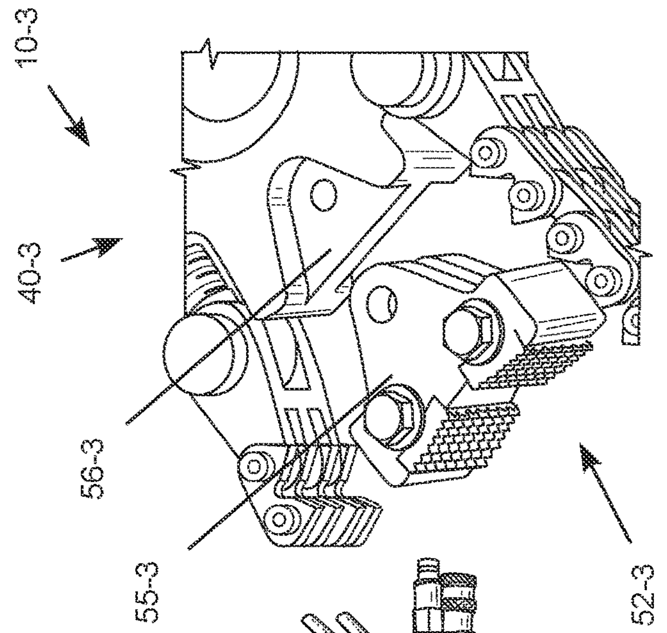
FIGS. 10A-10B are perspective views illustrating a torque slider tong assembly including a torque arm with another alternative version of the modular backer jaw.
Figure 10A:
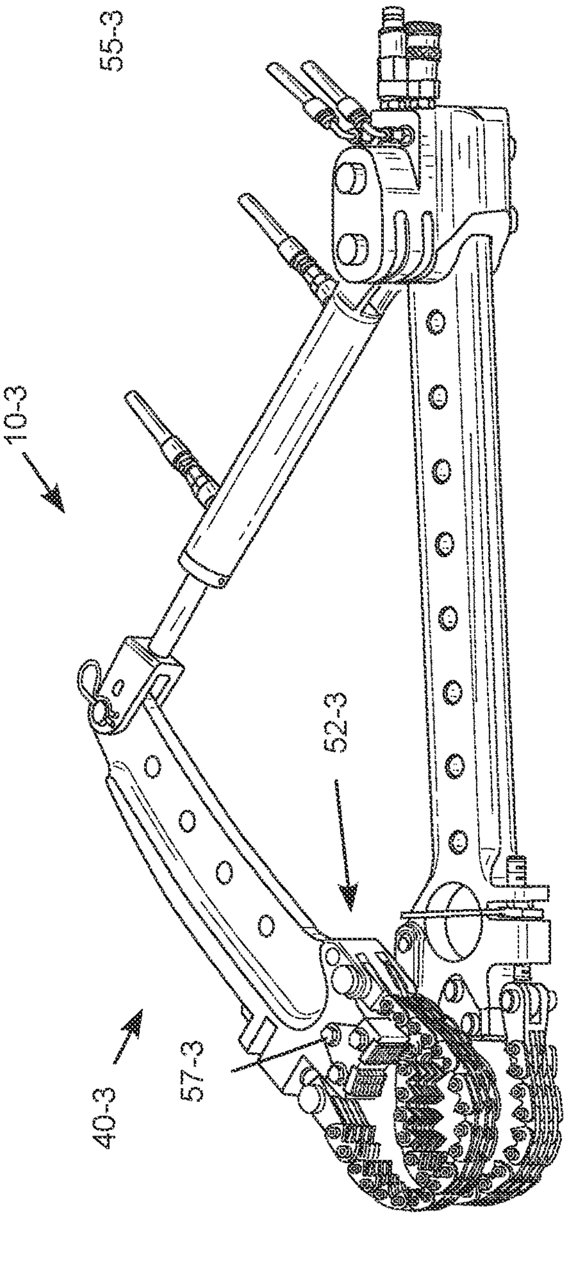

FIGS. 10A-10B are perspective views illustrating a torque slider tong assembly 10-3 including a torque arm 40-3 with an alternative version of the modular backer jaw 52-3. This particular version of the modular backer jaw includes a V-shaped clevis 55-3 that is removably received on a flange 56-3. Quick-change pin 57-3 allows the modular backer jaw 52-3 to be easily removed from the flange 56-3.

Figure 11B:
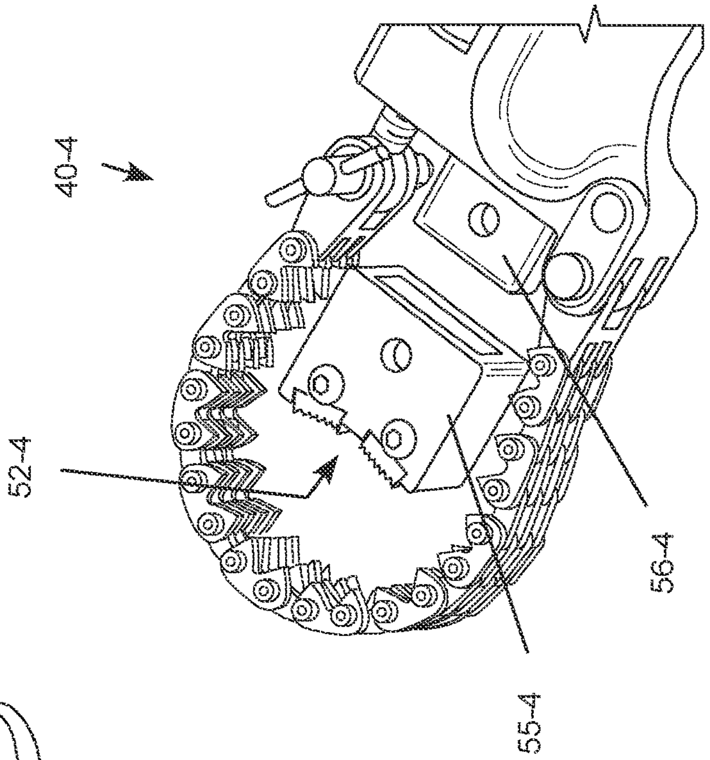
FIGS. 11A-11B are perspective views illustrating a torque arm with another alternative version of the modular backer jaw.
Figure 11A:
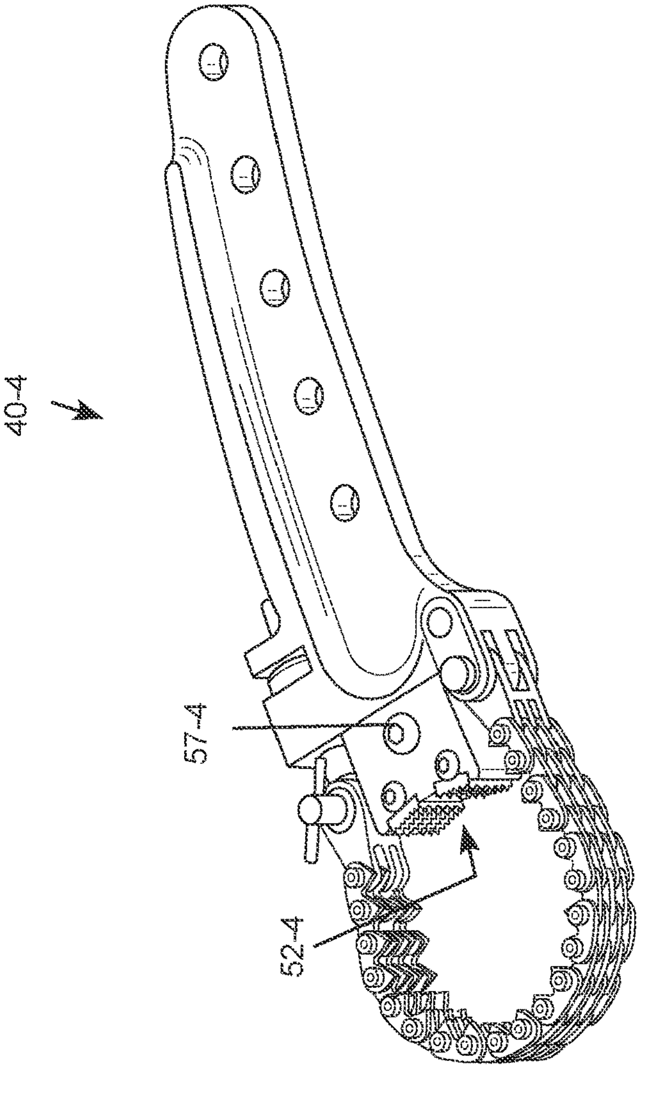

FIGS. 11A-11B are perspective views illustrating a torque arm 40-4 with an alternative version of the modular backer jaw 52-4. This particular version of the modular backer jaw includes a collar 55-4 that is removably received on a throat 56-4. A bolt 57-5 allows the modular collar 55-4 to be removed from the throat 56-4 using an appropriate type of wrench.

Figure 12B:
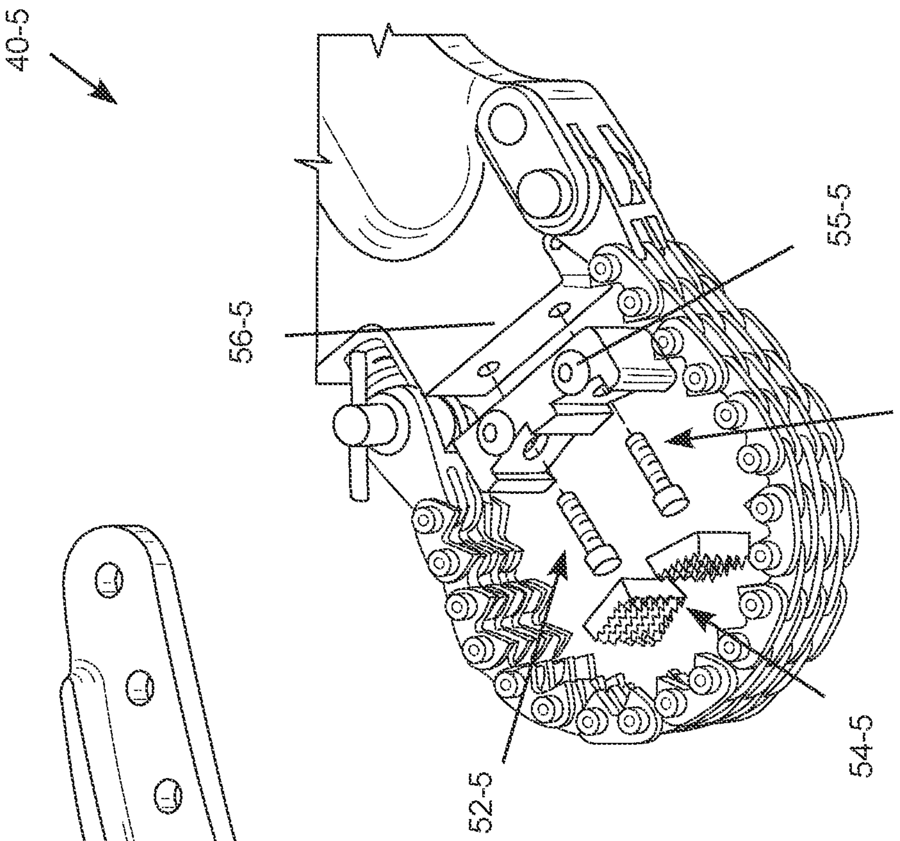
FIGS. 12A-12B are perspective views illustrating a torque arm with another alternative version of the modular backer jaw.
Figure 12A:
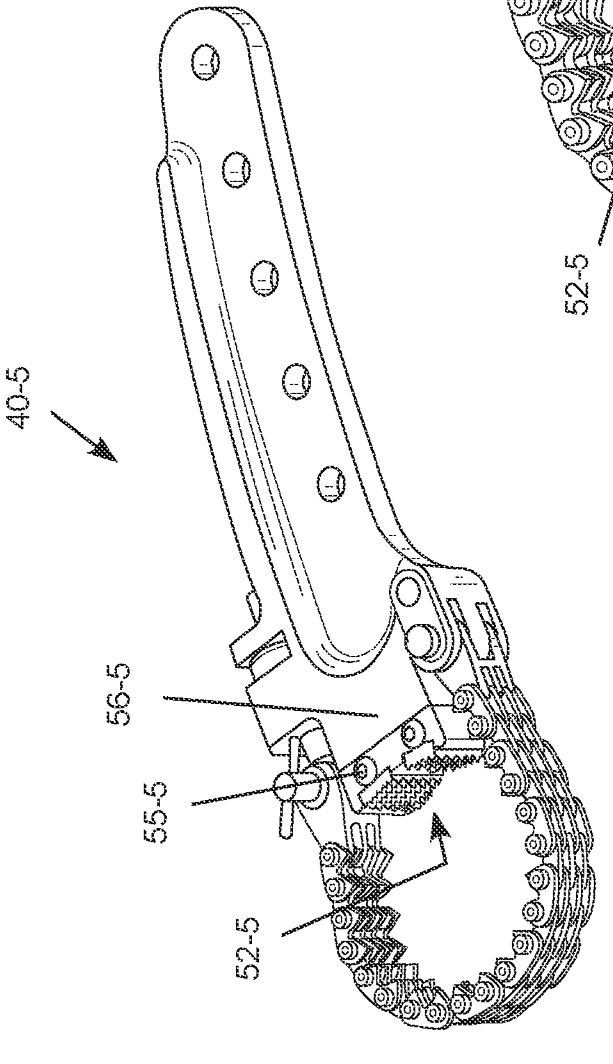

FIGS. 12A-12B are perspective views illustrating a torque arm 40-5 with an alternative version of the modular backer jaw 52-5. This particular version of the modular backer jaw includes a chuck 55-5 with two bolt holes removably received into an armature 56-5 including two threaded bolds sockets. A pair of bolts bolt 57-5, with their heads located behind removable backer bits 54-5, allow the chuck 55-5 to be removed from the armature 56-5 with convenience such as with quick release pins or a wrench or other hand tool. Alternatively, the bolts 57-5 may extend through the backer bits 54-5 with their heads countersunk below the gripping surfaces of the bits.

Figure 13B:
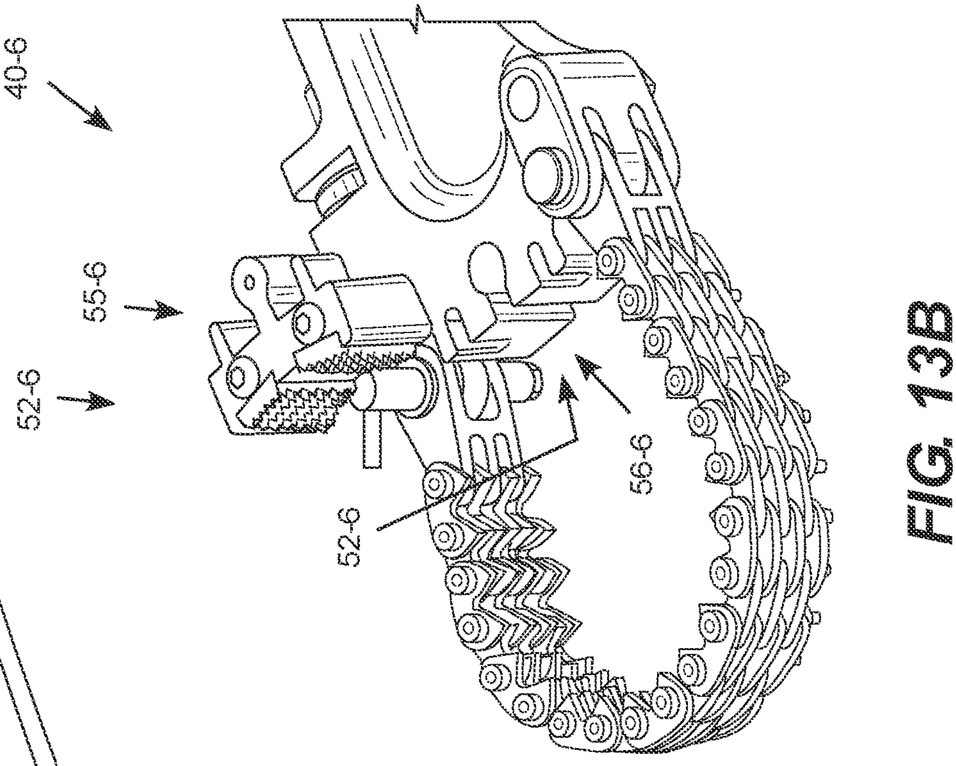
FIGS. 13A-13B are perspective views illustrating a torque arm with another alternative version of the modular backer jaw.
Figure 13A:
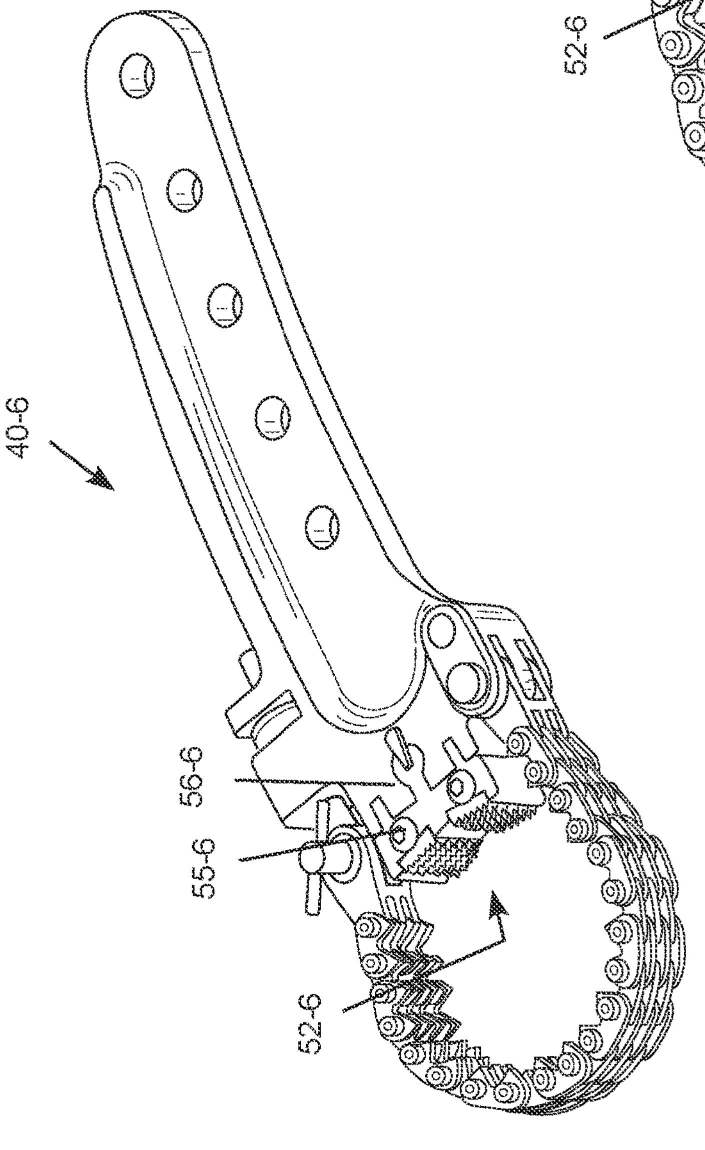

FIGS. 13A-13B are perspective views illustrating a torque arm 40-6 with an alternative version of the modular backer jaw 52-6. This particular version of the modular backer jaw includes a chuck 55-56 slidably received into a socket 56-6. A snug interference fit between the chuck and the socket removably connects these components without the need for additional fasteners.

Figures 14, 15A, 15B, 16:
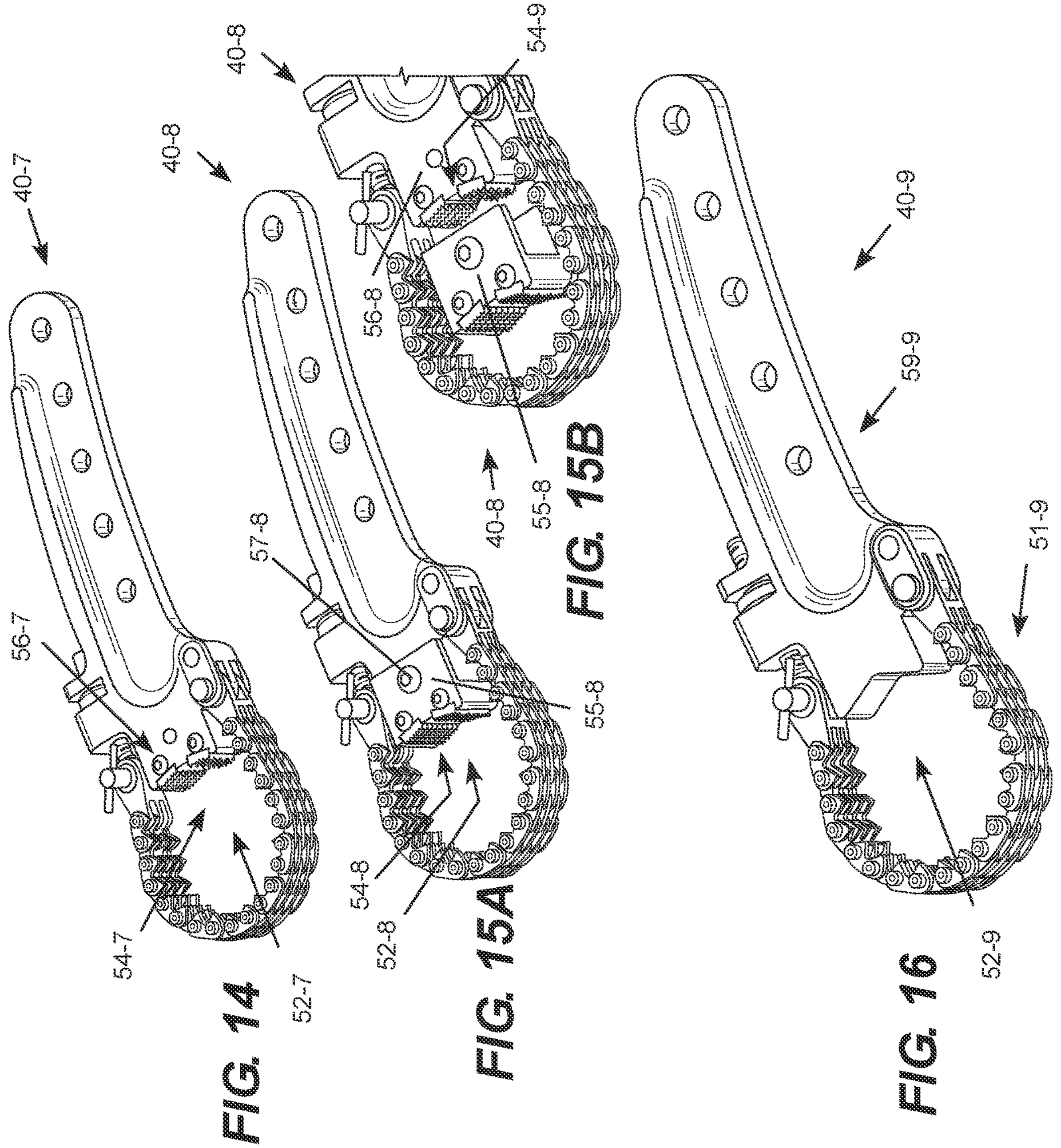
FIG. 14 is a perspective views illustrating a torque arm with another alternative version of the modular backer jaw.
FIGS. 15A-15B are perspective views illustrating a torque arm with another alternative version of the modular backer jaw.
FIG. 16 is a perspective views illustrating a torque arm with another alternative version of the modular backer jaw.

FIG. 14 is a perspective views illustrating a torque arm 40-7 with another alternative version of the modular backer jaw 52-7. This particular version of the modular backer jaw includes a pair of backer bits 54-7 slidably received directly onto a faceplate 56-7 of the torque arm 40-7.

FIGS. 15A-15B are perspective views illustrating a torque arm 40-8 with an alternative version of the modular backer jaw 52-8. This particular version of the modular backer jaw includes a removable jacket 55-8 carrying a secondary set of backet bits (shown in FIG. 15B) that 54-8 that can be positioned over a primary set of backer bits 54-9 attached to the torque arm 40-8 A bolt 57-8 removably attaches the jacket 55-8 to the torque arm 40-8 over the primary set of backer bits.

FIG. 16 is a perspective views illustrating a torque arm 40-9 with another alternative version of the modular backer jaw. This particular version of the modular backer jaw includes a bit-free backer jaw 52-9 integrally formed as part of the torque arm. This version is suitable, for example, for a non-metallic tool used with a non-metallic jaw strap 51-9 in a spark-free embodiment, an electrically non-conductive embodiment, an embodiment not susceptible to acidic corrosion, or other specialty application, such as a non-marking jaws.

Figure 17:
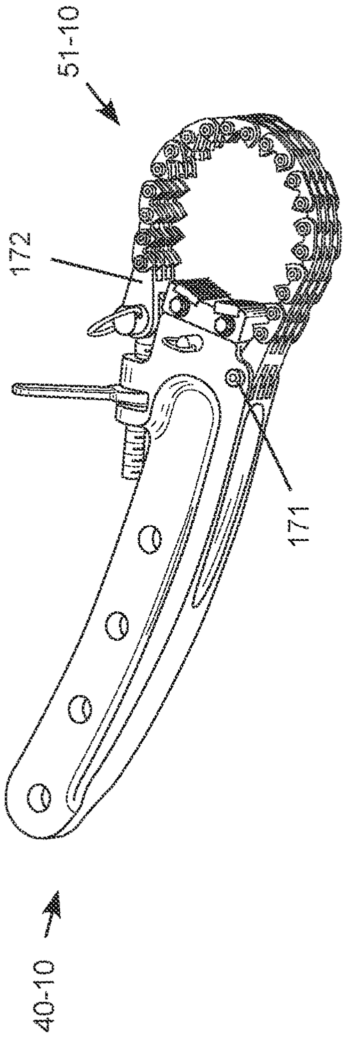
FIG. 17 is a perspective view illustrating a torque arm with an alternative version of the torque arm jaw strap.

FIG. 17 is a perspective view illustrating a torque arm 40-10 with an alternative version of the torque arm jaw strap 51-11. This particular version of the torque arm jaw strap includes a bolt 171 attaching one end of the jaws strap to the torque arm, and a quick-change pin 172 attaching the other end of the jaws strap to the torque arm.

Figure 18:
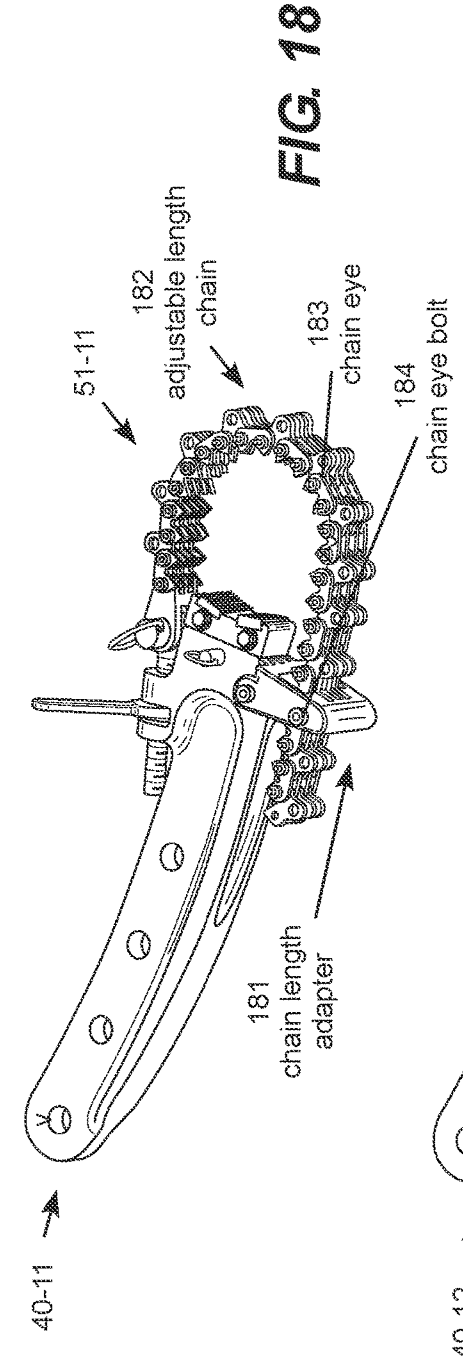
FIG. 18 is a perspective view illustrating a torque arm with another alternative version of the torque arm jaw strap.

FIG. 18 is a perspective view illustrating a torque arm 40-11 with an alternative version of the torque arm jaw strap 51-11. This particular version of the torque arm jaw strap includes an chain length adapter 181 and an adjustable length chain 182, which includes a number of links with chain eyes represented by the enumerated chain eye 183. The chain length adapter 181 includes a chain eye bolt 184 that removably attaches to selected chain eyes 183 to adjust the length of the chain tensioned by the jaws.

Figure 19:
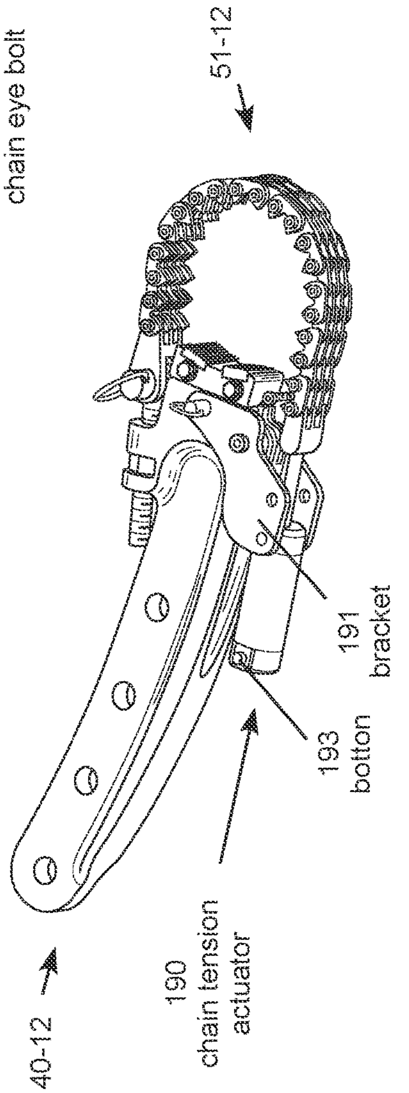
FIG. 19 is a perspective view illustrating a torque arm with another alternative version of the torque arm jaw strap.

FIG. 19 is a view illustrating a torque arm 40-12 with an alternative version of the torque arm jaw strap 51-12. This particular version of the torque arm jaw strap includes a chain tension actuator 190, such as a battery powered servo motor, that tensions the torque arm jaw strap 51-12 without the use of tools. The chain tension actuator 190 is supported by a bracket 191 that removably attaches to the tool. In this embodiment, the chain tension tensioner 190 pivots on the bracket 191 and includes a button 193 the operator presses to energize the actuator when the chain tension tensioner 190 is pivoted into position.

Figure 20:
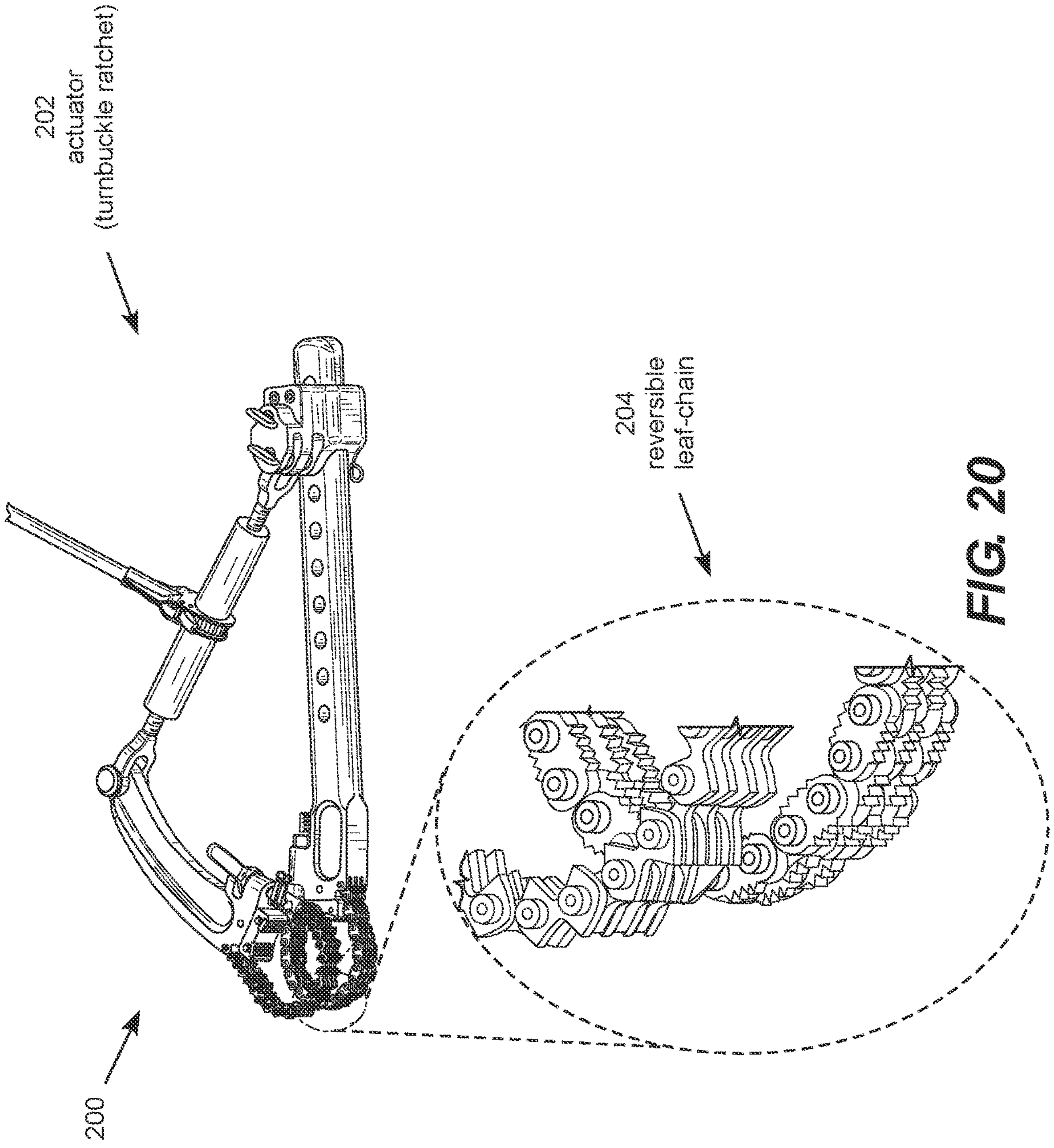
FIG. 20 is a perspective view of an alternative torque slider tong assembly with a turnbuckle ratchet actuator.

FIG. 20 is a perspective view of an alternative torque slider tong assembly 200 with a turnbuckle ratchet actuator 202. This particular embodiment also includes a reversible leaf-chain jaw strap 204 with teeth on both sides of the links. As another option, the reversible leaf-chain may include metal teeth on one side and non-metallic grip pads on the other side.

Figure 21:
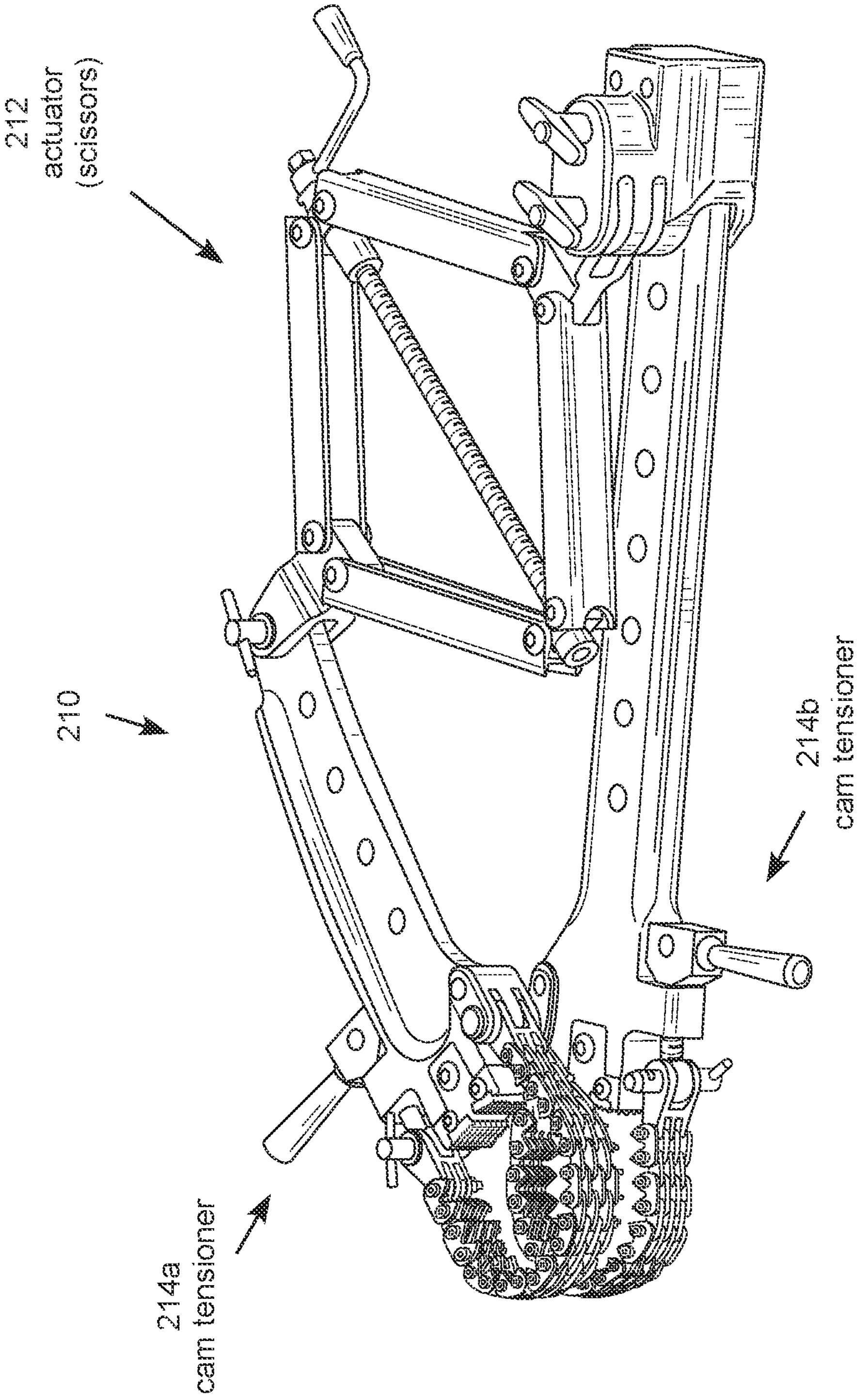
FIG. 21 is a perspective view of another alternative torque slider tong assembly with a scissors actuator.

FIG. 21 is a perspective view of an alternative torque slider tong assembly 210 with a hand-crank scissors actuator 212. This particular embodiment also includes hand-operated cam jaw strap tensioners 214*a*-214*b*. The cam tensioners included threaded holes receiving tensioner rods connected to the jaws strap for strap length adjustment.

Figure 22:
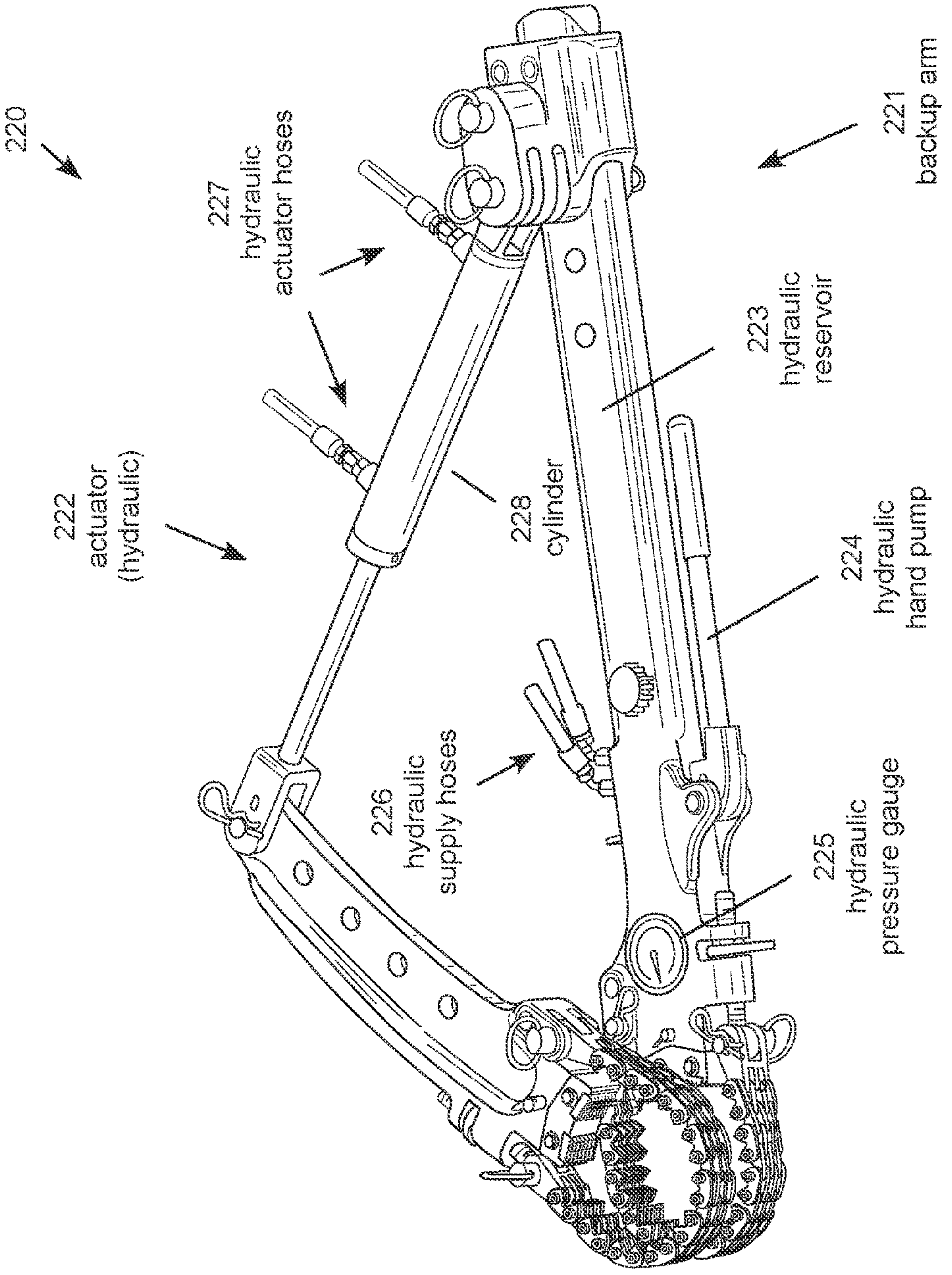
FIG. 22 is a perspective view of another alternative torque slider tong assembly with an integrated hydraulic actuator.

FIG. 22 is a perspective view of another alternative torque slider tong assembly 220 with an integrated hydraulic actuator 222 including a hydraulic reservoir 223 built into the backup arm 221 (the fill cap is shown, but not numbered proximate the hydraulic hand pump lever). The actuator also include a hydraulic hand pump 224 for pressurizing the hydraulic fluid in the reservoir 223 and a hydraulic pressure gauge 225. Hydraulic supply hoses 226 communicate the hydraulic fluid with hydraulic actuator hoses 227 connected to the cylinder (piston element) 228 of the actuator.

Figure 23:
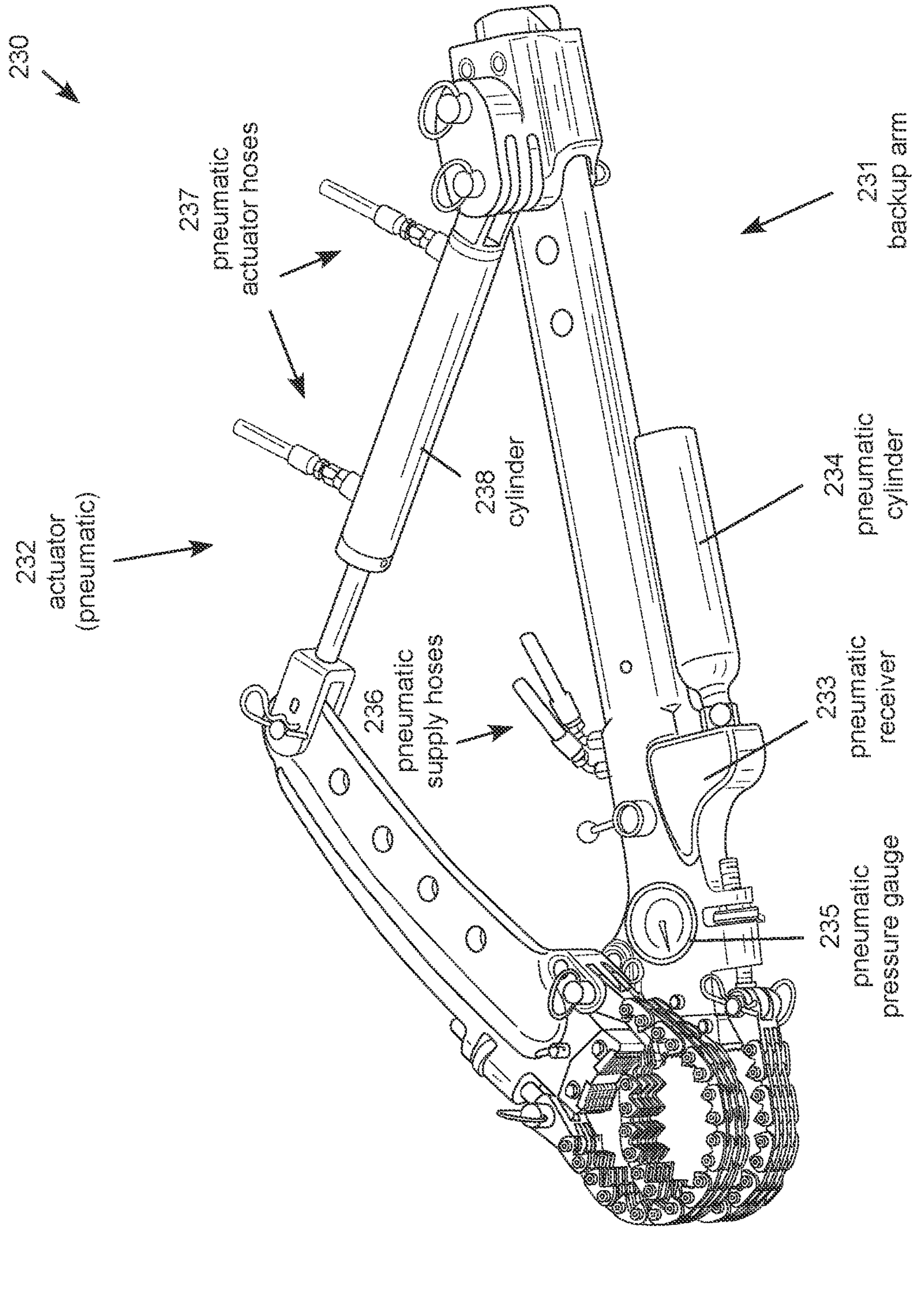
FIG. 23 is a perspective view of another torque slider tong assembly with an integrated pneumatic actuator.

FIG. 23 is a perspective view of another alternative torque slider tong assembly 230 with an integrated pneumatic actuator 232 including a pneumatic receiver 233 built into the backup arm 231. The actuator also include a removable hydraulic cylinder 234 that can be connected to the pneumatic receiver 233 to provide pressurized gas, such as air, to the tool and a pneumatic pressure gauge 235. The pneumatic receiver 233 may alternatively be connected to supply hose connected to a separate air compressor. Pneumatic supply hoses 236 communicate the pneumatic gas with pneumatic actuator hoses 227 connected to the cylinder (piston element) 238 of the actuator.

Figure 24:
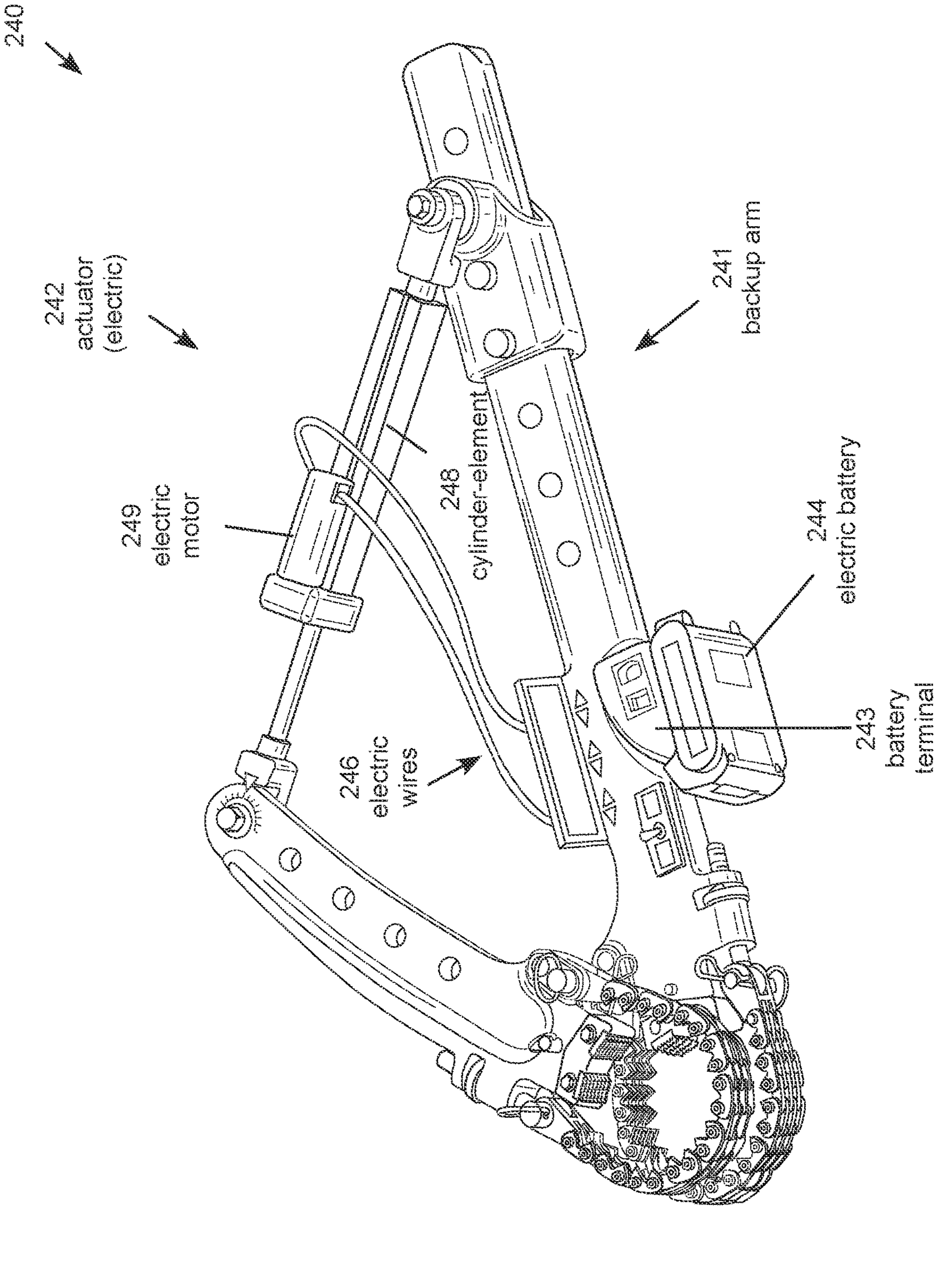
FIG. 24 is a perspective view of another torque slider tong assembly with an integrated electric actuator.

FIG. 24 is a perspective view of another alternative torque slider tong assembly 240 with an integrated electric actuator 242 including an battery terminal 243 built into the backup arm 241. The actuator also includes a removable electric battery 244 that connects to the battery terminal 243 to provide electric power, such 20 Volt DC electric power, to the tool. The battery terminal 243 may alternatively be connected to an electric power cord connected to a separate electric power supply, such as a 120 Volt AC electric power. Electric wires 246 electrically connect the electric battery 244 to an electric motor 249 that drives the cylinder (actuator element) 248 of the actuator. Also shown is an on/off switch, pressure and duration display elements for control use, and other electronic and display components, including directional-arrow-triggers (more/less, faster/slower, etc.) so as to effectively operate actuator 242.

Figure 25A:
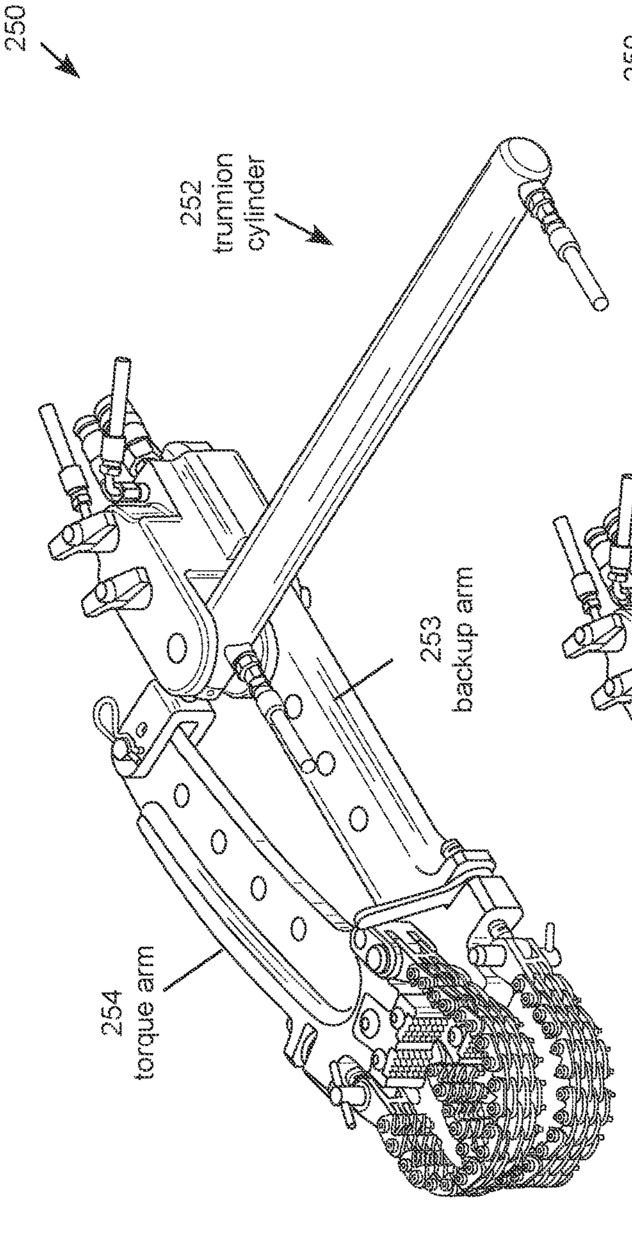
FIGS. 25A-25B are a perspective views of another torque slider tong assembly with a trunnion cylinder actuator.
Figure 25B:
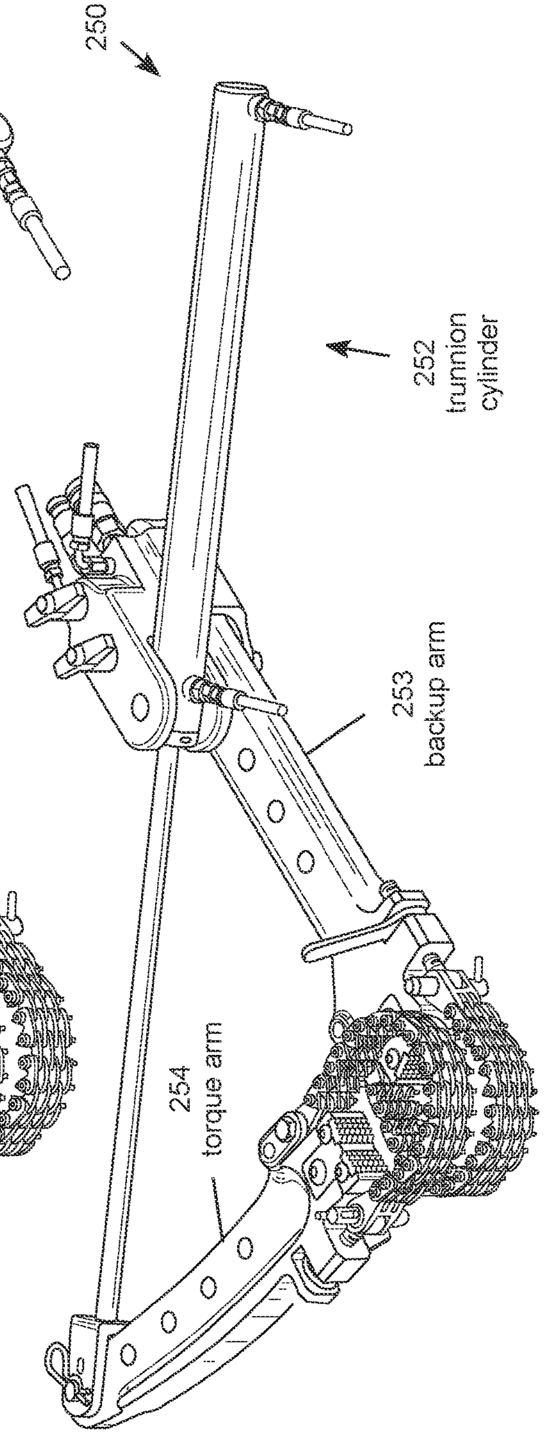

The torque slider tong assembly can also be outfitted with different types of actuators. As another option, for example, FIGS. 25A-25B are a perspective views of another torque slider tong assembly 250 with a trunnion cylinder actuator 252 to provide wider range of motion between the backup arm 253 and the tension arms 254 than the base models shown in FIGS. 1A and 1B.

Figure 26:
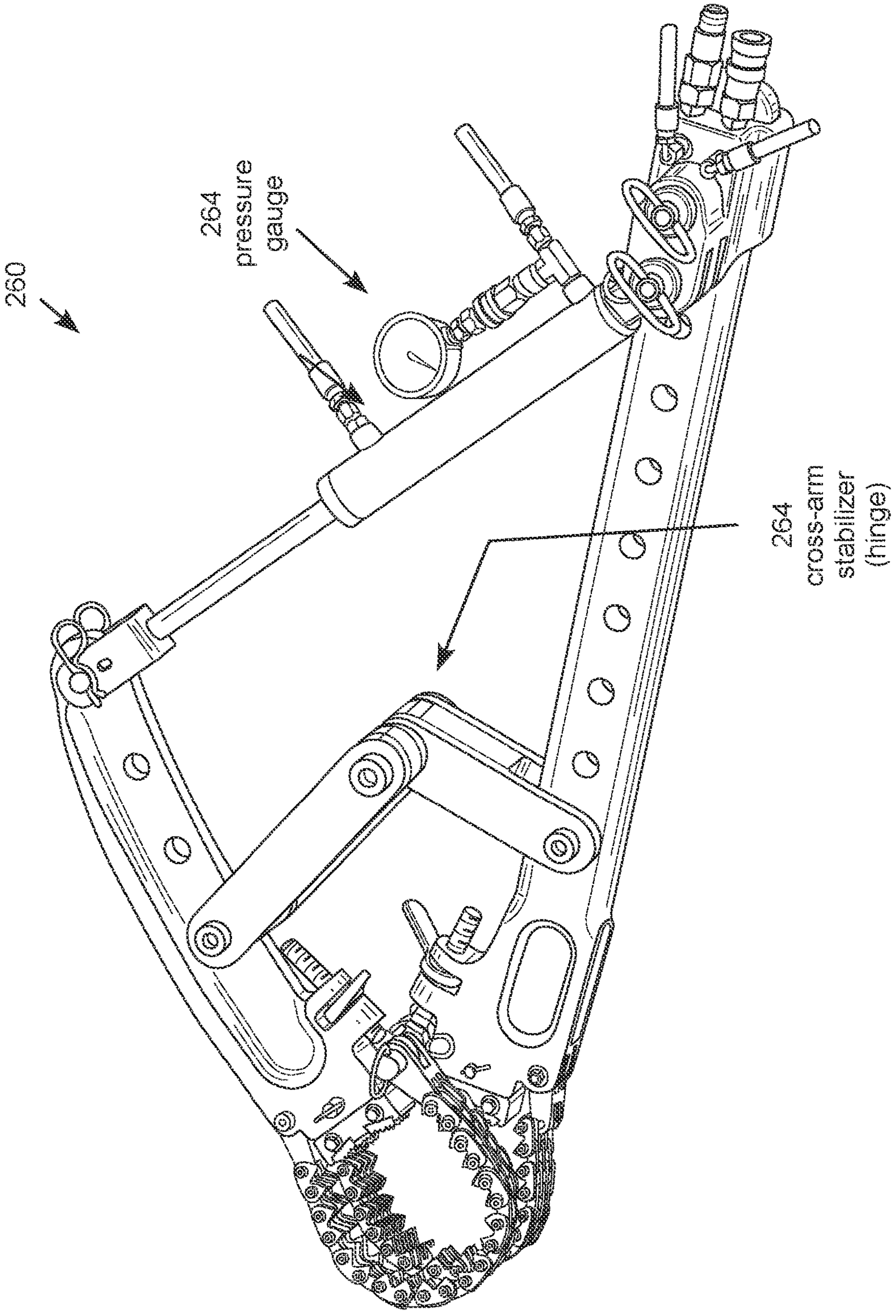
FIG. 26 is a perspective view of another torque slider tong assembly with a hinge cross-arm stabilizer.
Figure 27:
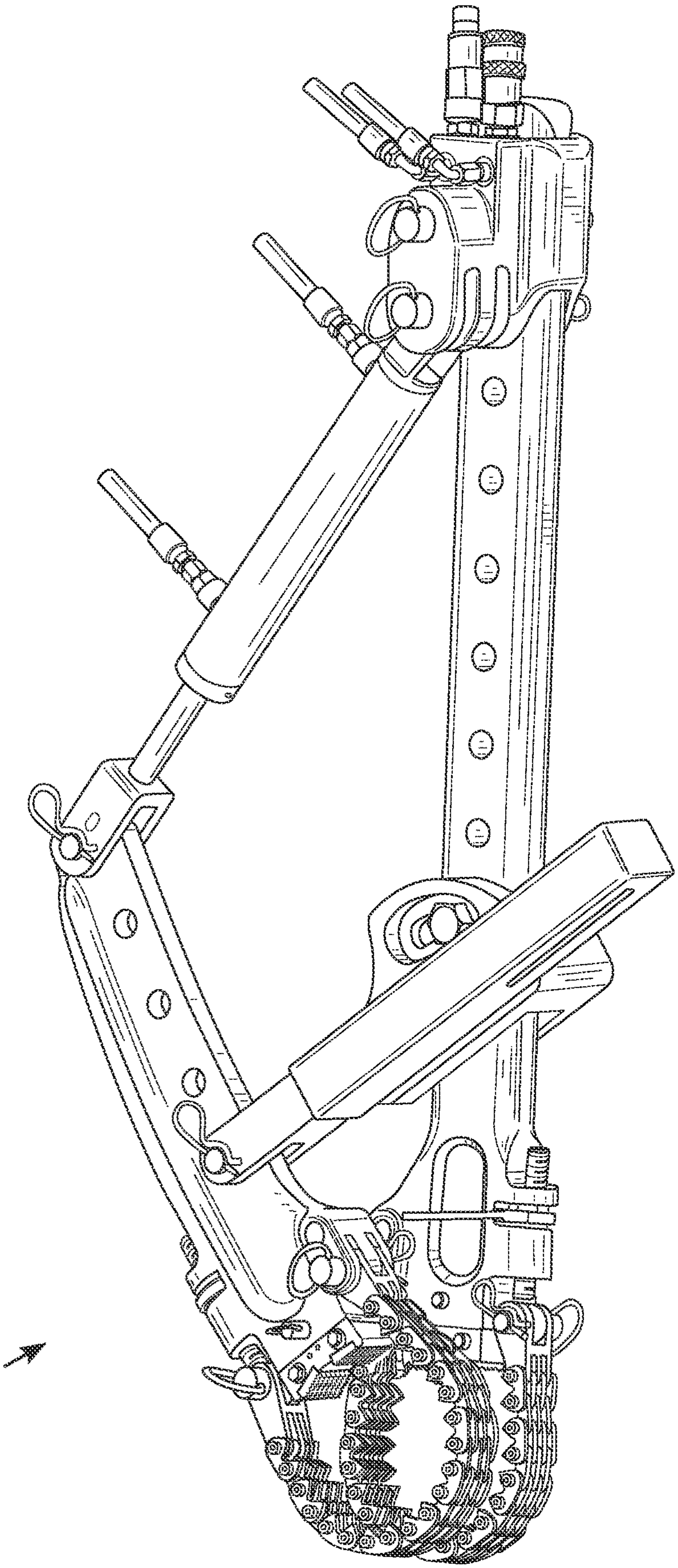
FIG. 27 is a perspective view of another torque slider tong assembly with a telescoping type cross-arm stabilizer.
Figure 28A:
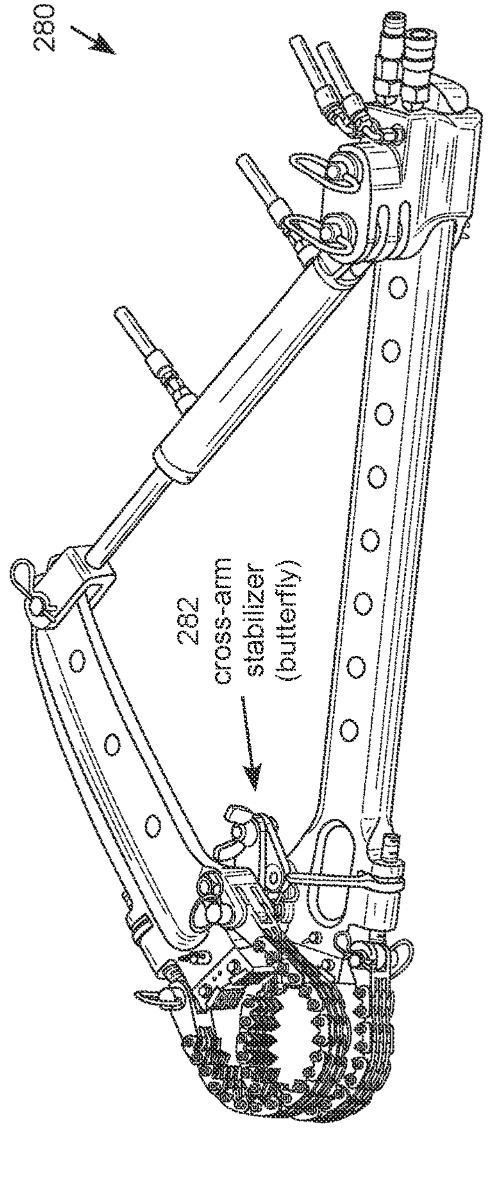
FIGS. 28A and 28B are perspective views of another torque slider tong assembly with a butterfly type cross-arm stabilizer.
Figure 28B:
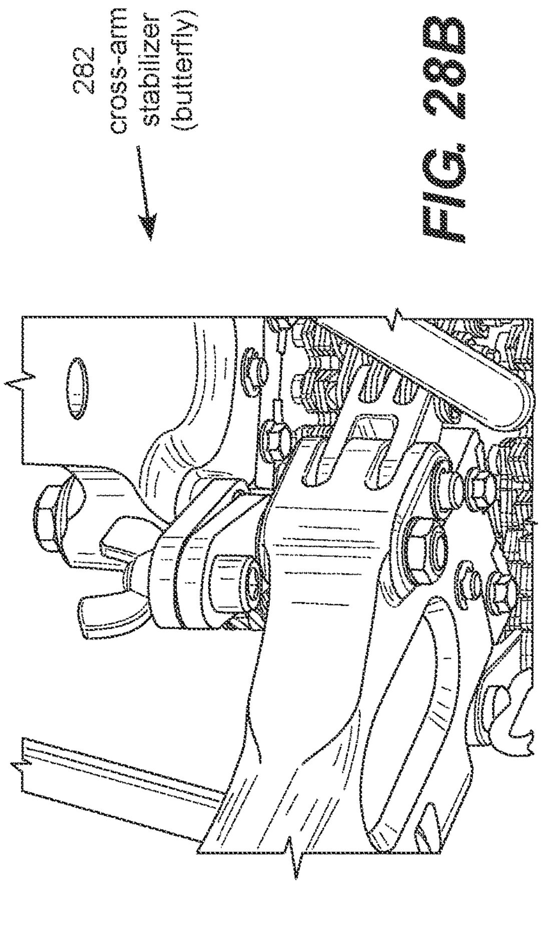

As another option, the torque slider tong assembly may include a variety of cross connecting stabilizers that connect the two arms in the transverse direction, without interfering with the operation of the tool or distorting torque readings. For example, FIG. 26 is a perspective view of a torque slider tong assembly 260 with a hinge cross-arm stabilizer 262. This particular embodiment also includes a hydraulic pressure gauge 264. To provide a few additional examples, FIG. 27 illustrates an embodiment 270 with a telescoping type cross-arm stabilizer 272, and FIGS. 28A and 28B illustrate an embodiment 280 as a butterfly type cross-arm stabilizer 282.

Figure 29:
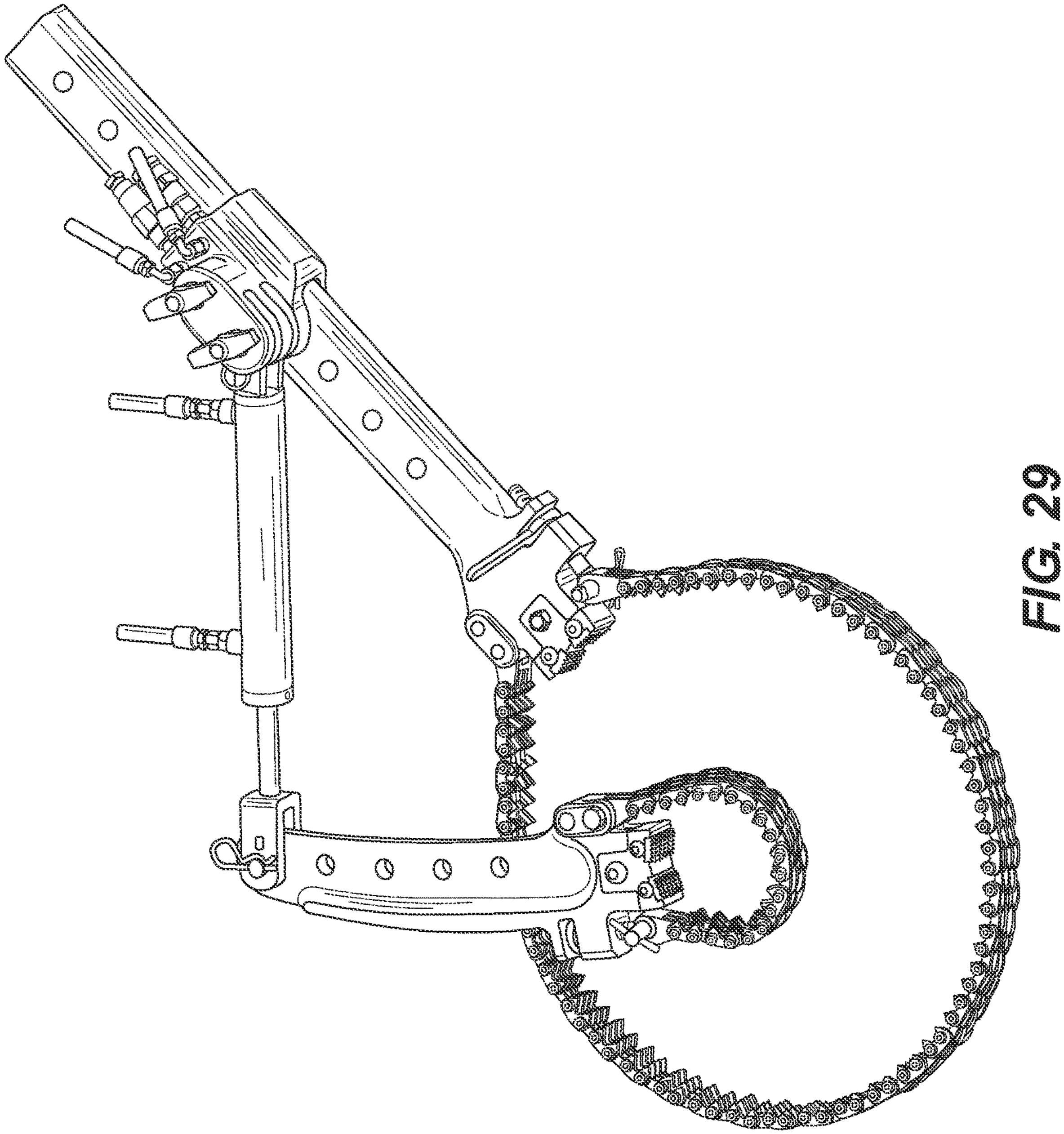
FIG. 29 is a perspective view of a torque arm of the torque slider tong assembly illustrating an extreme diameter offset capability.
Figure 30:
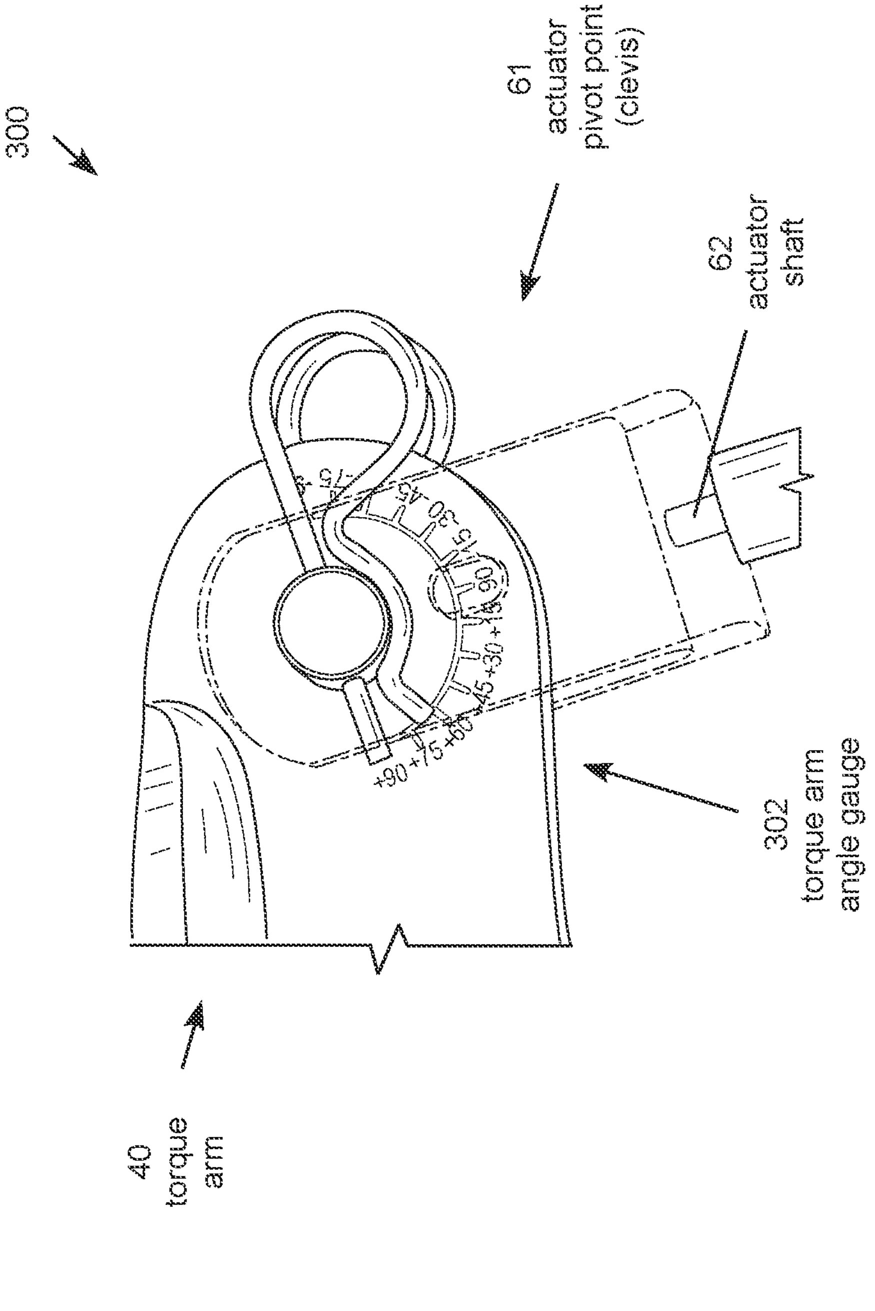
FIG. 30 is a perspective view of a torque angle gauge for the torque slider tong assembly.

FIG. 29 is a perspective view of a torque arm of the torque slider tong assembly 290 illustrating an extreme diameter offset capability. In addition, FIG. 30 is a perspective view of an embodiment 300 with a torque angle gauge 300 connected to the pivot point between the torque arm 40 and the actuator 60. This is a helpful accessory allowing accurate torque measurements, which are a function of the length of the torque arm from the actuator pivot point to the rotational axis of the workpiece, the angle between the torque arm and the actuator shaft, and the pressure applied by the actuator to the torque arm.

As used herein the phrase hosel is intended to be understood as shown in the drawings as an extending portion from a main body forming a clevis component to operate as indicated for the bolt. It is understood that hosel is broadly understood an extending element from a main body without other limitation.

It will be further understood that descriptive phrases such as backer bits 54 etc. or backer jaws 52 etc. (and others identified) are non-limiting and operate as shown, such that the bits/jaws may be formed of any suitable materials, having different harnesses (metal or plastic) and different electrical conductivities (conductive/insulative) so as to be effective when used on a wide variety of pipes; and may be referred to by other phrases, such as dies, insert dies, tong inserts, tong dies, or other related phrases without departing from the scope and spirit of the present invention.

The inventors intend that only those claims which use the specific and exact phrase "means for" are intended to be interpreted under 35 USC 112. The structure herein is noted and well supported in the entire disclosure. Moreover, no limitations from the specification are intended to be read into any claims, unless those limitations are expressly included in the claims.

Having described at least one of the preferred embodiments of the present invention with reference to the accompanying drawings, it will be apparent to those skills that the invention is not limited to those precise embodiments, and that various modifications and variations can be made in the presently disclosed system without departing from the scope or spirit of the invention. Thus, it is intended that the present disclosure cover modifications and variations of this disclosure provided they come within the scope of the appended claims and their equivalents as understood by one of skill in this complex art having considered the entire disclosure herein.

The invention claimed is:

1. A tong assembly for rotating a first pipe with respect to a second pipe about an alignment axis, comprising:

a backup arm comprising a backup arm jaws for selectively gripping the first pipe;

the back up arm having a plurality of torque slider position holes arrayed along a length of the backup arm;

a torque arm comprising a torque arm jaws for selectively gripping the second pipe;

the torque arm having a plurality of actuator position holes arrayed along a length of the torque arm;

the torque arm jaws being a modular backer jaws slidably received in a socket in the torque arm;

an actuator pivotably connected to the torque arm at a first end of the actuator and pivotably linked to the backup arm at a second end of the actuator for causing relative movement of the torque arm with respect to the backup arm transverse to the alignment axis, thereby causing relative rotation of the second pipe with respect to the first pipe about the alignment axis;

the actuator is a hydraulic actuator;

a torque slider movably captured on the backup arm at one or more of said plurality of torque slider position holes for selectively adjusting a connection point between the second end of the actuator and the backup arm for adjusting the relative movement of the torque arm with respect to the backup arm transverse to the alignment axis caused by extension and retraction of the actuator;

a pivot point movably and removably connected to the torque arm for selectively adjusting a connection point between the first end of the actuator and the torque arm at one of said plurality of actuator position holes for adjusting the relative movement of the torque arm with respect to the backup arm transverse to the alignment axis caused by extension and retraction of the actuator;

a torque angle gauge disposed at a pivot point between the torque arm and the actuator whereby said torque angle gauge indicates a relative angle between the torque arm and the back up arm; and a telescoping cross-arm stabilizer extends between the torque arm and the backup arm and is removably pivotably linked to the torque arm and is removably and slidably fixably linked to the back up arm.

2. The tong assembly of claim 1, further comprising:

a plurality of torque slider quick-change position pins for adjusting the connection point between the actuator and the torque slider by hand after removal of cotter pins.

3. The tong assembly of claim 1, wherein:

the torque arm jaws further comprise:

a torque arm jaw strap, a torque arm backer jaw, and a torque arm tensioner for selectively tightening and loosening the second pipe between the torque arm jaw strap and the torque arm backer jaw.

4. The tong assembly of claim 3, further comprising:

quick-release chain pins for removing the torque arm jaw strap from the torque arm.

5. The tong assembly of claim 4, further comprising:

a quick-release backer jaw pin for removing the torque arm backer jaw from the backup arm.

6. The tong assembly of claim 1, wherein:

the backup arm jaws further comprises a backup arm jaw strap, a backup arm backer jaw, and a backup jaw tensioner for selectively tightening and loosening the second pipe between the backup arm tooth jaw strap and the backup arm backer jaw.

7. The tong assembly of claim 6, further comprising:

quick-change chain pins for removing the backup arm jaw strap from the backup arm.

8. The tong assembly of claim 7, further comprising:

a quick-change backer jaw pin for removing the backup arm backer jaw from the backup arm.

9. The tong assembly of claim 1, wherein:

a torque arm jaw strap and a backup arm jaw strap are selected from the group consisting of a chain comprising links with pipe gripping teeth in one side, a reversible chain comprising links with pipe gripping teeth in two sides, and a non-metallic belt.

10. The tong assembly of claim 1, further comprising:

a backup arm jaws tensioner for selectively tightening the backup arm jaws on the first pipe, and a torque arm jaws tensioner for selectively tightening the torque arm jaws on the second pipe.

11. The tong assembly of claim 10, wherein:

the torque arm jaws or the backup arm jaws tensioner further comprises a clevis, a threaded rod extending through the clevis, and a captured nut carried on the threaded rod positioned within the clevis.

12. The tong assembly of claim 11, wherein:

the torque arm jaws or the backup arm jaws tensioner further comprises a ratchet captured on the captured nut for adjusting the torque arm jaws or the backup arm jaws tensioner by hand without using tools.

13. The tong assembly of claim 1, wherein:

the backup arm further comprises a hydraulic pump, hydraulic reservoir, hydraulic gauge, and hydraulic hoses operably connecting the backup arm to the hydraulic actuator.

14. The tong assembly of claim 1, further comprising:

the telescoping cross-arm stabilizer extending between the torque arm and the backup arm further includes a pivoting hinge between the torque arm and the back up arm.

15. A tong assembly for rotating a first pipe with respect to a second pipe about an alignment axis, comprising:

a backup arm comprising a backup arm jaws for selectively gripping the first pipe;

the back up arm having a plurality of torque slider position holes arrayed along a length of the backup arm;

a torque arm comprising a torque arm jaws for selectively gripping the second pipe;

the torque arm having a plurality of actuator position holes arrayed along a length of the torque arm;

the torque arm jaws being modular a modular backer jaws slidably received in a socket in the torque arm;

an actuator pivotably connected to the torque arm at a first end of the actuator and pivotably linked to the backup arm at a second end of the actuator for causing relative movement of the torque arm with respect to the backup arm transverse to the alignment axis, thereby causing relative rotation of the second pipe with respect to the first pipe about the alignment axis;

the actuator is a pneumatic actuator;

a torque slider movably captured on the backup arm at one or more of said plurality of torque slider position holes for selectively adjusting a connection point between the second end of the actuator and the backup arm for adjusting the relative movement of the torque arm with respect to the backup arm transverse to the alignment axis caused by extension and retraction of the actuator;

a pivot point movably and removably connected to the torque arm for selectively adjusting a connection point between the first end of the actuator and the torque arm at one of said plurality of actuator position holes for adjusting the relative movement of the torque arm with respect to the backup arm transverse to the alignment axis caused by extension and retraction of the actuator;

a torque angle gauge disposed at a pivot point between the torque arm and the actuator whereby said torque angle gauge indicates a relative angle between the torque arm and the back up arm; and a telescoping cross-arm stabilizer extends between the torque arm and the backup arm and is removably pivotably linked to the torque arm and is removably and slidably fixably linked to the back up arm.

16. The tong assembly of claim 15, wherein:

the backup arm further comprises a pneumatic pump, pneumatic reservoir, pneumatic gauge, and pneumatic hoses operably connecting the backup arm to the pneumatic actuator.

17. A tong assembly for rotating a first pipe with respect to a second pipe about an alignment axis, comprising:

a backup arm comprising a backup arm jaws for selectively gripping the first pipe;

the back up arm having a plurality of torque slider position holes arrayed along a length of the backup arm;

a torque arm comprising a torque arm jaws for selectively gripping the second pipe;

the torque arm having a plurality of actuator position holes arrayed along a length of the torque arm;

the torque arm jaws being modular a modular backer jaws slidably received in a socket in the torque arm;

an actuator pivotably connected to the torque arm at a first end of the actuator and pivotably linked to the backup arm at a second end of the actuator for causing relative movement of the torque arm with respect to the backup arm transverse to the alignment axis, thereby causing relative rotation of the second pipe with respect to the first pipe about the alignment axis;

the actuator is an electric actuator;

a torque slider movably captured on the backup arm at one or more of said plurality of torque slider position holes for selectively adjusting a connection point between the second end of the actuator and the backup arm for adjusting the relative movement of the torque arm with respect to the backup arm transverse to the alignment axis caused by extension and retraction of the actuator;

a pivot point movably and removably connected to the torque arm for selectively adjusting a connection point between the first end of the actuator and the torque arm at one of said plurality of actuator position holes for adjusting the relative movement of the torque arm with respect to the backup arm transverse to the alignment axis caused by extension and retraction of the actuator;

a torque angle gauge disposed at a pivot point between the torque arm and the actuator whereby said torque angle gauge indicates a relative angle between the torque arm and the back up arm; and a telescoping cross-arm stabilizer extends between the torque arm and the backup arm and is removably pivotably linked to the torque arm and is removably and slidably fixably linked to the back up arm.

18. The tong assembly of claim 17, wherein: the backup arm further comprises an electric battery receptacle and electric wires operably connecting the backup arm to the electric actuator.

* * * * *